US008285019B2

(12) United States Patent
Raundahl et al.

(10) Patent No.: US 8,285,019 B2
(45) Date of Patent: Oct. 9, 2012

(54) BREAST TISSUE DENSITY MEASURE

(75) Inventors: Jakob Raundahl, Kokkedal (DK); Marco Loog, Copenhagen (DK); Mads Nielsen, Dragor (DK); Sami Sebastian Brandt, Malmo (SE); Gopal Raghunath Karemore, Skovlunde (DK)

(73) Assignee: SYNARC Inc., Newark, CA (US)

( * ) Notice: Subject to any disclaimer, the term of this patent is extended or adjusted under 35 U.S.C. 154(b) by 299 days.

(21) Appl. No.: 12/787,703

(22) Filed: May 26, 2010

(65) Prior Publication Data

US 2011/0013819 A1    Jan. 20, 2011

Related U.S. Application Data

(63) Continuation-in-part of application No. 12/317,530, filed on Dec. 23, 2008, which is a continuation-in-part of application No. 12/223,550, filed as application No. PCT/EP2007/051284 on Feb. 9, 2007.

(30) Foreign Application Priority Data

Feb. 10, 2006 (GB) .................................. 0602739.5

(51) Int. Cl.
*G06K 9/00* (2006.01)
*G01B 15/02* (2006.01)
(52) U.S. Cl. ........................... 382/128; 382/274; 378/50
(58) Field of Classification Search .................. 382/100, 382/128, 129, 130, 131, 132, 133, 134, 168, 382/173, 181, 194, 209, 216, 219, 232, 305, 382/254, 276, 307, 312, 274; 378/20–25, 378/50
See application file for complete search history.

(56) References Cited

U.S. PATENT DOCUMENTS

| 5,799,100 | A  | * | 8/1998  | Clarke et al. ................... 382/132 |
| 7,123,762 | B2 | * | 10/2006 | Giger et al. .................... 382/132 |
| 7,315,640 | B1 | * | 1/2008  | Brady et al. ................... 382/132 |
| 7,418,123 | B2 | * | 8/2008  | Giger et al. .................... 382/132 |

(Continued)

FOREIGN PATENT DOCUMENTS

WO    0079474 A1    12/2000

OTHER PUBLICATIONS

S. Arya, D. M. Mount, N. S. Netanyahu, R. Silverman, and A. Wu. An optimal algorithm for approximate nearest neighbor searching. Journal of the ACM, 45(6):891-923, 1998.

(Continued)

*Primary Examiner* — Seyed Azarian
(74) *Attorney, Agent, or Firm* — Edwards Wildman Palmer LLP; Peter C. Lauro, Esq.

(57) ABSTRACT

A method of processing a mammogram image to derive a value for a parameter useful in detecting differences in breast tissue in subsequent images of the same breast or relative to a control group of such images, said derived parameter being an aggregate probability score reflecting the probability of the image being a member of a predefined class of mammogram images, comprises computing for each of a multitude of pixels within a large region of interest within the image a pixel probability score assigned by a trained statistical classifier according to the probability of said pixel belonging to an image belonging to said class, said pixel probability being calculated on the basis of a selected plurality of features of said pixels, and computing said parameter by aggregating the pixel probability scores over said region of interest. Saud features may include the 3-jet of said pixels.

30 Claims, 18 Drawing Sheets

U.S. PATENT DOCUMENTS

| | | | |
|---|---|---|---|
| 7,848,558 B2* | 12/2010 | Giger et al. | 382/132 |
| 7,873,198 B2* | 1/2011 | Shepherd et al. | 382/132 |
| 8,086,002 B2* | 12/2011 | Zhang et al. | 382/128 |

OTHER PUBLICATIONS

U. Bick, M. Giger, R. Schmidt, R. Nishikawa, D. Wolverton, and K. Doi. Automated segmentation of digitized mammograms. Academic Radiology, 2(1):1-9, 1995.

J. M. Boone, K. K. Lindfors, C.S. Beatty, and J. A. Seibert, "A breast density index for digital mammograms based on radiologists' ranking," Journal of Digital Imaging, vol. 11, No. 3, pp. 101-115, Aug. 1998.

N. F. Boyd, J. M. Rommens, K.Vogt,V. Lee, J. L. Hopper, M. JYaffe, and A. D. Paterson, "Mammographic breast density as an intermediate phenotype for breast cancer," The Lancet Oncology, vol. 5, pp. 798-808, 2005.

N. Boyd, L. Martin, Q. Li, L. Sun, A. Chiarelli, G. Hislop, M.Yaffe, and S. Minkin, "Mammographic density as a surrogate marker for the effects of hormone therapy on risk of breast cancer," Cancer Epidemiology Biomarkers&Prevention, vol. 15, No. 5, p. 961, 2006.

J.W. Byng, N. F. Boyd, E. Fishell, R. A. Jong, and M. J. Yaffe, "The quantitative analysis of mammographic densities," Physics in Medicine and Biology, vol. 39, p. 162938, 1994.

J.W. Byng, N.F. Boyd, E. Fishell, R. A. Jong, and M. J.Yaffe, "Automated analysis of mammographic densities," Physics in Medicine and Biology, vol. 41, pp. 909-923, 1996.

J.W. Byng, N.F. Boyd, L. Little, G. Lockwood, E. Fishell, R. A. Jong, and M. J.Yaffe, "Symmetry of projection in the quantitative analysis of mammographic images," European Journal of Cancer Prevention, vol. 5, pp. 319-327, 1996.

R. Chandrasekhar and Y. Attikiouzel. A simple method for automatically locating the nipple on mammograms. IEEE transactions on medical imaging, 16(5):483-494, 1997.

E. Claus, N. Risch, andW. Thompson, "Autosomal dominant inheritance of early-onset breast cancer. implications for risk prediction." Cancer, vol. 73, No. 3, pp. 643-51, 1994.

M. H. Gail, L. A. Brinton, D. P. Byar, D. K. Corle, S. B. Green, C. Schairer, and J. J. Mulvihill, "Projecting individualized probabilities of developing breast cancer for white females who are being examined annually," Journal of the National Cancer Institute, vol. 81, No. 24, pp. 1879-1886, Dec. 1989.

F. Georgsson. Anatomical coordinate system for bilateral registration of mammograms. In Proc. Scandinavian Conference on Image Analysis (SCIA), vol. 2749 of LNCS, pp. 335-342, 2003.

Y. Guo, R. Sivaramakrishna, C.-C. Lu, J. Suri, and S. Laxminarayan. Breast image registration techniques: A survey. Med Biol Eng Comput, 44:15-26, 2006.

I. Guyon and A. Elisseeff, "An introduction to variable and feature selection," The Journal of Machine Learning Research, vol. 3, pp. 1157-1182, 2003.

B. M. ter Haar Romeny, L. M. J. Florack, A. H. Salden, and M. A. Viergever, "Higher order differential structure of images,"Image and Vision Computing, vol. 12, No. 6, pp. 317-325, Jul./Aug. 1994.

Z. Huo, M. Giger, D. Wolverton, W. Zhong, S. Cumming, and O. Olopade, "Computerized analysis of mammographic parenchymal patterns for breast cancer risk assessment: Feature selection," Medical Physics, vol. 27, p. 4, 2000.

A.K.Jain,R.P.W.Duin,andJ.Mao, "Statistical patternrecognition: Areview," IEEETr. onPAMI, vol. 22, No. 1, pp. 4-37, 2000.

G. Karemore, I. Arganda-Carreras, and M. Nielsen. Automatic and consistent registration framework for temporal pairs of mammograms in application to breast cancer risk assessment due to hormone replacement therapy (hrt). Int J CARS, 4(Supplement 1):S356, Jun. 2009. Poster Session: 11th International Workshop on Computer-Aided Diagnosis.

G. Karemore and M. Nielsen. Fractal dimension and lacunarity analysis of mammographic patterns in assessing breast cancer risk related to hrt treated population: a longitudinal and cross-sectional study. In Medical Imaging 2009: Computer-Aided Diagnosis, vol. 7260 of Proceedings of the SPIE, pp. 72602F-72602F-9, 2009.

M. Karnan and K. Thangavel. Automatic detection of the breast border and nipple position on digital mammograms using genetic algorithm for asymmetry approach to detection of microcalcifications. Comput. Methods Prog. Biomed., 87(1):12-20, 2007.

N. Karssemeijer, "Automated classi?cation of parenchymal patterns in mammograms," Physics in Medicine and Biology, vol. 43, pp. 365-378, 1998.

S. Kinoshita, P. Azevedo-Marques, R. Pereira, J. Rodrigues, and R. Rangayyan. Radon-Domain Detection of the Nipple and the Pectoral Muscle in Mammograms. Journal of Digital Imaging, 21(1):37-49, 2008.

Y. Kita, E. Tohno, R. Highnam, and M. Brady. A CAD system for the 3d location of lesions in mammograms. Medical Image Analysis, 6:267-273, 2002.

J. J. Koenderink, "The structure of images," Biological cybernetics, vol. 50, No. 5, pp. 363-370, 1984.

J. Koenderink and A. van Doom, "Representation of local geometry in the visual system," Biological Cybernetics, vol. 55, No. 6,pp. 367-375, 1987.

S. Kwok, R. R Chandrasekhar, Y. Attikiouzel, and M. Rickard. Automatic pectoral muscle segmentation on mediolateral oblique view mammograms. IEEE transactions on medical imaging, 23(9):1129-1140, 2004.

A. Mendez, P. Tahoces, M. Lado, M. Souto, J. Correa, and J. Vidal. Automatic detection of breast border and nipple in digital mammograms. Computer methods and programs in biomedicine, 49(3):253-262, 1996.

T. Ojala, J. Nappi, and O. Nevalainen. Accurate segmentation of the breast region from digitized mammograms. Computerized Medical Imaging and Graphics, 25(1):47-59, 2001.

J. D. M. Often, N. Karssemeijer, J. H. C. L. Hendriks, J. H. Groenewoud, J. Fracheboud, A. L. M. Verbeek, H. J. de Koning, and R. Holland, "Effect of recall rate on earlier screen detection of breast cancers based on the dutch performance indicators," Journal of the National Cancer Institute, vol. 97, No. 10, pp. 748-754, May 2005.

S. Petroudi and M. Brady, "Breast density segmentation using texture," in InternationalWorkshop on Digital Mammography, S. M. Astley, M. Brady, C. Rose, and R. Zwiggelaar, Eds. Springer, 2006, pp. 609-615.

P C Pettersen, J Raundahl et al; 'Parallel assessment of the impact of different hormone replacement therapies on breast density by radiologist and computer based analyses of mammograms'; Climacteric 2008; 11:135-143.

J. Raundahl, M. Loog, and M. Nielsen. Understanding hessian-based density scoring. In Proc. 8th International Workshop on Digital Mammography, vol. 4046 of Lecture Notes in Computer Science, pp. 447-452, Manchester, UK, Jun. 2006.

J. Raundahl, M. Loog, P. Pettersen, L. Tanko, and M. Nielsen. Automated effect-specific mammographic pattern measures. IEEE Transactions on Medical Imaging, 27(8):1054-1060, Aug. 2008.

Jacob Raundahl thesis Mammographic Pattern Recognition.

Raundahl, Loog, Pettersen, Nielsen; 'Quantifying Effects-Specific Mammographic Density'; Miccai 2007, part II, LNCS 4792, pp. 580-587 2007.

C. Tromans and M. Brady, "An alternative approach to measuring volumetric mammographic breast density," in International Workshop on Digital Mammography, S. M. Astley, M. Brady, C. Rose, and R. Zwiggelaar, Eds. Springer, 2006, pp. 26-33.

S. van Engeland, P. Snoeren, J. Hendriks, and N. Karssemeijer. A comparison of methods for mammogram registration. IEEE Transactions of Medical Imaging, 22(11), 2003.

C. H. van Gils, J. H. C. L. Hendriks, R. Holland, N. Karssemeijer, J. D. M. Often, -I. Straatman, and a. L. M. Verbeek. Changes in mammographic breast density and concomitant changes in breast cancer risk. European Journal of Cancer Prevention, 8:509-515, 1999.

A. Whitney, "A direct method of nonparametric measurement selection," in IEEETrans. Comput., vol. 20, 1971, pp. 1100-1103.

J. N. Wolfe. Risk for breast cancer development determined by mammographic parenchymal pattern. Cancer, 37 (5):2486-2498, 1976.

M. Yam, M. Brady, R. Highnam, C. Behrenbruch, R. English, and Y. Kita. Three-dimensional reconstruction of microcalcification clusters from two mammographic views. IEEE Transactions on Medical Imaging, 20(6):479-489, 2001.

S.-C. Yang, H.-H. Hsu, G.-C. Hsu, P.-C. Chung, S. Guo, C.-S. Lo, C.-W. Yang, S.-K. Lee, and C.-I. Chang. 3d localization of clustered microcalcifications using cardio-caudal and medio-lateral oblique views. Computerized Medical Imaging and Graphics, 29:521-532, 2005.

F. Yin, M. Giger, K. Doi, C. Vyborny, and R. Schmidt. Computerized detection of masses in digital mammograms: Automated alignment of breast images and its effect on bilateral-subtraction technique. Medical Physics, 21:445, 1994.

C. Zhou, H. Chan, C. Paramagul, M. Roubidoux, B. Sahiner, L. Hadjiiski, and N. Petrick. Computerized nipple identification for multiple image analysis in computer-aided diagnosis. Medical Physics, 31:2871, 2004.

* cited by examiner

Segmented and zero-padded image

BC likelihood image

Sample region of interest (a)

Segmented and zero-padded image

BC likelihood image

Sample region of interest (b)

(a) σ = 1　　(b) σ = 2　　(c) σ = 4

(a) Unregistered mammogram　　(b) Registered breast region

BREAST TISSUE DENSITY MEASURE

CROSS-REFERENCE TO RELATED APPLICATIONS

This application is a continuation-in-part of U.S. application Ser. No. 12/317,530, filed Dec. 23, 2008, pending, which is a continuation-in-part of U.S. application Ser. No. 12/223,550, pending, which is the U.S. national phase pursuant to 35 U.S.C. §371 of International application Ser. No. PCT/EP2007/051284, filed Feb. 9, 2007 and published in English as WO 2007/090892 A1 on Aug. 16, 2007, which claims priority to GB 0602739.5, filed Feb. 10, 2006. The entire disclosures of the aforementioned patent applications are incorporated herein by this reference.

BACKGROUND OF THE INVENTION

The present invention relates to a method of detecting differences in breast tissue in subsequent images of the same breast.

Breast cancer is one of the largest serious diseases among women in the western world. It is the most common cancer in women accounting for nearly one out of every three cancers diagnosed in the United States. It is also the most common and deadly cancer for women on a global scale, where breast cancer accounts for 21% of all cancer cases and 14% of all cancer deaths.

However, if detected sufficiently early, there is a high probability of survival. Detection of breast cancer can be very difficult, since the first signs of breast cancer are often asymptomatic.

Mammograms have thus far been found to be the most effective way to detect breast cancer early, sometimes up to two years before a lump in the breast can be felt. Mammography is a specific type of imaging that uses a low-dose x-ray system. Once an image has been developed, doctors examine the image to look for signs that cancer is developing. Naturally, where human intervention is required, there is room for error or misjudgement. A lot of effort has therefore been put into the field of improving the processing of mammograms. The mammograms are mainly analysed by radiologists who look for abnormalities that might indicate breast cancer. These abnormalities include small calcifications, masses and focal asymmetries.

Various breast imaging techniques now exist that attempt to detect breast cancer earlier and in a more predictable fashion.

Digital mammography, also called full-field digital mammography (FFDM), is a mammography system in which the x-ray film is replaced by solid-state detectors that convert x-rays into electrical signals. These detectors are similar to those found in digital cameras. The electrical signals are used to produce images of the breast that can be seen on a computer screen or printed on special film similar to conventional mammograms. From the patient's point of view, digital mammography is essentially the same as the screen-film system.

Computer-aided detection (CAD) systems use a digitised mammographic image that can be obtained from either a conventional film mammogram or a digitally acquired mammogram. The computer software then searches for abnormal areas of density or calcification that may indicate the presence of cancer. The CAD system highlights these areas on the images, alerting the radiologist to the need for further analysis.

The present invention uses change in breast tissue to identify the possible risk of cancer. The methods of the invention described below do not seek to locate features within the image used, but rather assign an overall score to the image which is indicative of the probability of the image being associated with a higher breast density and hence providing a measure of the risk of cancer.

Several approaches to automatic or semi-automatic assessment of mammographic breast density have been suggested previously. The majority of these have been aimed at reproducing the radiologists' categorical rating system. Boone et al [Journal of Digital Imaging 11(3) August 1998, 101-115] aimed at making a continuously scaled breast density index. Six mathematical features were calculated from the mammograms and used in conjunction with single value decomposition and multiple linear regression to calculate a computerised breast density. The training was done using a collection of mammograms sorted by their density as perceived by an expert.

Karssemeijer [Physics in Medicine and Biology 43 (1998) 365-378] divided the breast area into different regions and extracted features based on the grey level histograms of these regions. Using these features a kNN classifier is trained to classify a mammogram into one of four density categories. Byng et al [Physics in Medicine and Biology 41 (1996) 909-923] used measures of the skewness of the grey level histogram and of image texture characterised by the fractal dimension. They showed that both measures are correlated with the radiologists' classifications of the mammographic density. Tromans et al and Petroudi et al [in Astley et al; International workshop on Digital Mammography, Springer 2006, 26-33 and 609-615] used automated density assessment employing both physics based modelling and texture based learning of BI-RADS categories and Wolfe Patterns.

The Breast Imaging Reporting and Data System (BI-RADS) is a four category scheme proposed by the American College of Radiology. The BI-RADS categories are:
1. Entirely fatty
2. Fatty with scattered fibroglandular tissue
3. Heterogeneously dense
4. Extremely dense.

In practice, these classifications are used to alert clinicians that the ability to detect small cancers in the dense breast is reduced. The four categories are represented by the numbers one to four in order of increasing density.

Others, including Zhou et al [Medical physics 28(6), June 2001, 1056-1069] have used thresholding of the image based on properties of the grey level histogram to get an estimate of the percentage of density in the breast or [Yaffe et al 1994] use thresholding done by a radiologist. In the thresholding method, the reading radiologist determines an intensity threshold using a slider in a graphical user interface. The radiologist is assisted visually by a display showing the amount of dense tissue corresponding to the current slider position. The density is defined as the ratio between segmented dense tissue and total area of breast tissue. The continuous nature of such threshold adjustment makes the method more sensitive than the BI-RADS, Wolfe patterns and related scoring systems with a low number of categories when detecting or monitoring, perhaps small, density changes.

A currently frequently discussed issue related to breast cancer risk is the potential influence of hormone replacement therapy taken after the menopause. If breast density is indeed a surrogate measure of risk for developing cancer in the breast, a sensitive measure of changes in breast density during hormone dosing provides an estimate of the gynaecological safety of a given treatment modality. Hence, the concept of breast density has an ongoing interest.

The meaning of the word density depends on the context. The physical density states how much the breast tissue attenuates x-rays locally. An assessment of the projected area and specifically the distribution of fibroglandular tissue is often called dense tissue, and can be thought of as a "biological density". This can be considered as an intrinsic property of the entire breast, and is the type of density referred to in the context of Wolfe Patters and related assessments.

A further aspect of the invention described below relates to an improved coordinate system for registration of images.

Numerous studies have investigated the relation between mammographic density and breast cancer risk, and women with high breast density appear to have a four to six fold increase in breast cancer risk [Wolfe 1976, van Gils 1999, Boyd 2005]. More recently, it has been suggested that heterogeneity of mammogram texture is also related with mammographic risk [Raundahl 2006, Karemore 2009]. However, the link between heterogeneity of mammogram and breast density with breast cancer risk is not yet well established.

Our previous work [Raundahl 2008] suggests the framework for obtaining accurate and sensitive measurements of breast density change due to various hormonal replacement therapies by calculating texture change (Heterogeneity examination of mammograms). These methods include calculation of N-JET features [Koenderink 1987] (Gaussian derivatives up to order of three in four different scale) considering image coordinates as a orthonormal base vectors, typically aligned with the rows and columns of the image. There are disadvantages with expressing coordinates in relation to mammogram image frame and not with the anatomy of the breast tissue structures.

The breast is a mass of glandular, fatty, and fibrous tissues positioned over the pectoral muscles of the chest wall and attached to the chest wall by fibrous strands called Cooper's ligaments. A layer of fatty tissue surrounds the breast glands and extends throughout the breast. The fatty tissue gives the breast a soft consistency. The glandular tissues of the breast house the lobules (milk producing glands at the ends of the lobes) and the ducts (milk passages). Toward the nipple, each duct widens to form a sac (ampulla). These structures motivate us to derive a coordinate system for the breast in a mammogram considering anatomical orientation of tissues.

To perform automated analysis of 2D mammograms, most of the previous approaches first segment the breast region and then do the analysis inside the breast region in the image. It is common to analyse the images in the x-y coordinate system and even discard the position information of the extracted features. However, the x and y-axis directions do not have a direct anatomical meaning and due to the variability between the shapes of the breasts, a fixed direction in one mammogram may anatomically correspond to a completely different direction in another.

In this work, we have developed an anatomical breast coordinate system that identifies corresponding positions and locations between any arbitrary two mediolateral (ML) or mediolateral oblique (MLO) view mammograms. Our starting hypothesis was that feature registration according to anatomical orientations and positions gives additional discrimination power to feature classification between cancer and control patient groups. Since there is a huge variability between breasts, it is problematic to obtain direct position and orientation correspondence between an arbitrary two female breasts.

Our work is related to previous work that has considered registration of mammograms, either as bilateral registration, or longitudinal registration (see e.g. Raundahl 2008). The breast coordinate transform described here can be also seen as a registration method, but due to its construction there is no need to explicitly warp the images. The idea instead is to identify the anatomical coordinate system for the images and extract the features with respect to that coordinate frame, i.e. in the orientations and positions defined by the breast coordinate frame but maintaining the scale of the image. In other words, we define the mapping that defines the local correspondence between any two breasts as soon as their anatomical landmarks or breast parameters have been identified.

There are several works in the literature addressing the automatic extraction of the anatomical landmarks. The localization of the pectoral muscle has been considered e.g. in [Karssemeijer 1998, Kwok 2004, Kinoshita 2008], the nipple location in [Yin 1994, Mendez 1996, Chandrasekhar 1997, Zhou 2004, Karnan 2007, Kinoshita 2008], and breast boundary in [Yin 1994, Bick 1995, Mendez 1996, Ojala 2001, Karnan 2007]. There is therefore no need to describe here the automatic finding of these features, and the starting point for our work is that the line approximating the pectoral muscle, the nipple location, and breast boundary approximation are known or obtained manually.

Georgsson 2003 considered bilateral registration for bilateral comparison; in addition, there are several works that address the registration of breasts in three dimensions [Kita 2002, Yam 2001, Yang 2005]. Georgsson defined the two dimensional coordinate system by the distance from the skin-line and the distance to the nipple-line along to an equidistant curve (equidistant from the skin line). We instead describe below construction of a nonlinear parametric coordinate system based on a subset of second order curves. Our coordinate system is minimally identified from the location of the nipple, two points on the breast boundary, boundary normal direction at the nipple, and the pectoral line. The method is generalisable to other kinds of image.

BRIEF SUMMARY OF THE INVENTION

The present inventors aim to provide a framework for obtaining more accurate and sensitive measurements of breast density changes related to specific effects, specifically by using a statistical learning scheme for devising a non-subjective and reproducible measure, given effect-grouped patient data.

The present invention provides a method of processing a mammogram image to derive a value for a parameter useful in detecting differences in breast tissue in subsequent images of the same breast or relative to a control group of such images, said derived parameter being a parameter that changes alongside or together with changes in breast density, the method comprising the steps of processing an image of at least part of a breast by:

computing for pixels of the image a quotient value representative of the aspect ratio of tissue structures depicted in the image;

using a trained classifier to classify said pixels according to their respective said quotient values and assigning a score to the respective pixels representing their classification with respect to at least two classes;

deriving said parameter that changes alongside changes in breast density based on the aggregate pixel membership scores of said classes.

According to one practice of the invention, the trained classifier is trained by unsupervised learning. According to a second practice of the invention, the trained classifier is trained by supervised learning. Examples of both are provided below.

Optionally, said classifier is trained by supervised learning based on a set of images associated with a higher breast density and a set of images associated with a lower breast density.

The pixels may be scored as belonging to one of said classes, i.e. may be allocated with a probability score of 1 to the specific class judged most appropriate, or on the other hand may be scored according to their probability of belonging to at least one of said classes with a probability score of up to 1.

Said quotient value may be determined for each said pixel at each of a plurality of scales, suitably three scales.

Said quotient values may be determined as the normalised difference between eigenvalues of a Hessian matrix based on Gaussian derivatives at a predetermined scale of pixels of the image, which Gaussian derivatives relate the intensity of each pixel to the intensities of the neighbours of said pixel.

According to one preferred aspect of the present invention there is provided a method of processing a mammogram image to derive a value for a parameter useful in detecting differences in breast tissue in subsequent images of the same breast, said derived parameter being a parameter that changes alongside changes in breast density, the method comprising the steps of:
 processing an image of at least part of a breast;
 computing a quotient value representative of the aspect ratio of tissue structures depicted in the image for pixels of the image;
 plotting these values on a pre-determined model of a cluster map, said cluster map having at least two pre-plotted points;
 clustering the plotted values around said at least two pre-plotted points to result in two discrete clusters; and
 deriving said parameter that changes alongside changes in breast density by computing the difference in area between said two clusters.

In a preferred embodiment the pre-determined model is defined in 3-dimensional space in which the three dimensions represent the quotient value when calculated at different scales.

Preferably, the step of clustering further comprises:
 calculating which of said at least two pre-plotted points each plotted value is closest to; and
 assigning each value accordingly to said closest pre-plotted point to result in said two discrete clusters of plotted points.

In an embodiment, there is provided a preliminary step of preparing said pre-determined model of the cluster map incorporating said at least two pre-plotted points.

The step of preparing the model of the cluster map may further comprise:
 a) computing a quotient value for pixels in a test image of a breast based on the results of Hessian matrices compiled for said pixels in the image;
 b) plotting each quotient value in 3-dimensional space;
 c) randomly selecting at least two points amongst the quotient values as starting points;
 d) calculating the distance between each quotient value and each starting point and assigning each quotient value to the starting point to which it is nearest;
 e) calculating a mean of each group of points and redefining the starting point as the calculated mean point;
 iteratively repeating steps d) and e) until the calculated mean point is equal to the starting point, whereby the final calculated mean points are arranged to be the pre-plotted points of the model of the cluster map.

Preferably, the number of pre-plotted points determines the number of resulting clusters.

More preferably, the pre-determined model of the cluster map has four pre-plotted points.

In a preferred embodiment, four points are randomly selected as starting points to result in said four pre-plotted points for the model of the cluster map.

Preferably, the Hessian matrices are derived from Gaussian derivatives of the pixels in the image.

The method may further comprise deriving Gaussian derivatives at three different scales of the image to result in three different quotient values for each of said pixels, wherein the three quotient values correspond to the three dimensions of the pre-determined model.

Preferably, said quotient values define characteristics representative of the shape of objects present in the image.

More preferably, a quotient value of relatively large magnitude represents a substantially elongate object located in the image.

The method may further comprise deriving a parameter of the same breast at a subsequent period of time and computing the difference in the value of the first and subsequent parameter, wherein the difference is representative of changes in the breast tissue of the breast.

The method may include an additional first step of obtaining the required digital breast image by X-ray photography of a patient.

The method may include a further step of comparing the obtained parameter value for an image with equivalent parameter values obtained previously for which cancer risk has been quantified and thereby obtaining a quantitative cancer risk assessment for the image.

The invention includes a method of processing a mammogram image to derive a value for a parameter useful in detecting differences in breast tissue in subsequent images of the same breast or relative to a control group of such images, said derived parameter being an aggregate probability score reflecting the probability of the image being a member of a predefined class of mammogram images, said method comprising computing for each of a multitude of pixels within a large region of interest within the image a pixel probability score assigned by a trained statistical classifier according to the probability of said pixel belonging to an image belonging to said class, said pixel probability being calculated on the basis of a selected plurality of features of said pixels, and computing said parameter by aggregating the pixel probability scores over said region of interest. The large region of interest is preferably at least 50%, more preferably at least 80%, most preferably at least 90% of the mammogram image and the multitude of pixels within that ROI is preferably all of the pixels, but may be at least at least 50%, more preferably at least 80%, most preferably at least 90% of said pixels.

As before, the trained classifier may be trained by unsupervised learning or by supervised learning.

Preferably, said classifier is trained on a set of images associated with a higher breast density and a set of images associated with a lower breast density or is trained on a set of images associated with a higher risk of breast cancer and a set of images associated with a lower risk of breast cancer.

As before, a said pixel feature on the basis of which each pixel is classified may be a quotient value representative of the aspect ratio of a tissue structure depicted in the image in the to which structure said pixel belongs and said quotient value is determined for each said pixel at each of a plurality of scales.

Said quotient values may be determined as the normalised difference between eigenvalues of a Hessian matrix based on Gaussian derivatives at a predetermined scale of pixels of the image, which Gaussian derivatives relate the intensity of each pixel to the intensities of the neighbours of said pixel.

Alternatively however, a said pixel feature on the basis of which each pixel is classified may be a selected derivative from the set of n local, partial derivatives up to the order n (n-jet). Here n is an integer, preferably of not more than 5. Said n-jet is preferably the 3-jet. The n-jet may be implemented as Gaussian derivatives at a plurality of scales, for instance approximately 1 mm, 2 mm, 4 mm, and/or 8 mm (each +/−50%).

Said features may preferably include the third order horizontal derivatives in the 3-jet set.

The present invention further extends to a pre-programmed computational device means for receiving a set of digital data representative of at least part of a breast;
   means for computing a quotient value representative of an aspect ratio of tissue structures depicted in the image for pixels of the image;
   a trained classifier pre-programmed therein to classify said pixels according to their respective said quotient values and to assign a score to the respective pixels representing their classification with respect to at least two classes; and
   means for deriving said parameter that changes alongside changes in breast density based on the aggregate pixel membership scores of said classes.

The pre-programmed computational device may be one wherein said trained classifier has been trained by unsupervised learning or else one wherein said trained classifier has been trained by supervised learning, suitably based on a set of images associated with a higher breast density and a set of images associated with a lower breast density.

The programming may be such that said pixels are scored as belonging to one of said classes or else are scored according to their probability of belonging to at least one of said classes.

The programming may be such that said quotient value is determined for each said pixel at each of a plurality of scales.

The programming may be such that the quotient values are determined as the normalised difference between eigenvalues of a Hessian matrix based on Gaussian derivatives at a predetermined scale of pixels of the image, which Gaussian derivatives relate the intensity of each pixel to the intensities of the neighbours of said pixel.

In accordance with one preferred aspect of the invention, the programmed device is one having:
   means for receiving a set of digital data representative of at least part of a breast;
   means for computing a quotient value representative of an aspect ratio of tissue structures depicted in the image for pixels of the image;
   means for plotting these values on a pre-determined model of a cluster map, said cluster map having at least two pre-plotted points;
   means for clustering the plotted values around said at least two pre-plotted points to result in two discrete clusters; and
   means for deriving a parameter that changes alongside changes in breast density by computing the difference in area between said two clusters, wherein the parameter enables detection of differences in breast tissue in subsequent images of the same breast.

In a further aspect, the invention provides a method for ascribing coordinates to positions of points within an image performed in a suitably programmed computer and comprising for each point for which a set of coordinates is desired computing a first coordinate value s and a second coordinate value $\phi$ defining the position of said point in a coordinate system (s, $\phi$) wherein said coordinate system comprises a set of curves diverging from an apex point lying on a reference line which extends in a reference direction, each curve in said set of curves extending to intersect a base line extending from a first point to a second point,
said first coordinate s representing a measure of a geodesic distance from said apex point along one said curve which contains said point, and said second coordinate $\phi$ representing an angle made between said curve and said reference line at said apex point.

Within a bounded domain s $\in$ S, $\phi \in \Psi$ said curves are non-crossing.

Said first coordinate s may be equal to or proportional to a ratio a:b where a=the geodesic distance of the point from the apex and b=the geodesic distance from the apex to the intersection of said one curve with the base line.

Said set of curves may have 3 degrees of freedom and the curves may for instance be parabolae.

Said image may be of a human breast (for instance may be mammogram images) including a nipple and a pectoral muscle, and said apex point may be set at said nipple and said base line approximately following the pectoral muscle or its boundary. Said curves may then be non-crossing within the imaged breast.

The invention includes a method of comparing information contained within a first image of an object with information contained within at least one related other image, wherein said first and other images are related by being images from approximately or exactly the same perspective of the same object or being images of a second instance of the same type of object, comprising ascribing coordinates to positions within each image by a method as described above and comparing at least one characteristic of points in the respective images which have matching s and $\phi$ coordinates.

Said method may employ the features of the first aspect of the invention.

Thus, the method may comprise calculating Gaussian derivatives of a pre-selected order of image intensities at said points and may comprise classifying a said first image as belonging to a first class or a second class by applying a statistical classifier to said point image intensities.

The images may be mammograms and said classification may be between belonging to a group of images of healthy breasts and belonging to a group of images of breasts characterised by cancer.

The invention includes a method of processing a mammogram image which includes a nipple and a chest wall to derive a value for a parameter useful in detecting differences in breast tissue in subsequent images of the same breast or relative to a control group of such images, said derived parameter being a parameter that changes alongside changes in breast density, the method comprising the steps of processing an image of at least part of a breast by:
   calculating in a suitably programmed computer for pixels of the image respective coordinates by a method comprising for each point for which a set of coordinates is desired computing a first coordinate value s and a second coordinate value $\phi$ defining the position of said point in a coordinate system (s, $\phi$) wherein said coordinate system comprises a set of curves diverging from an apex point set at said nipple and lying on a reference line which extends in a reference direction, each curve in said set of curves extending to intersect a base line set generally to follow said chest wall and extending from a first point to a second point, said first coordinate s representing a measure of a geodesic distance from said apex point along one said curve which contains said point, and said second coordinate φ representing an angle made between said curve and said reference line at said apex point computing for pixels of the image a quotient value representative of the aspect ratio of tissue structures depicted in the image;

using a trained classifier to classify said pixels according to their respective said quotient values and assigning a score to the respective pixels representing their classification with respect to at least two classes;

deriving said parameter that changes alongside changes in breast density based on the aggregate pixel membership scores of said classes.

Said trained classifier may be trained by unsupervised learning or by supervised learning.

Said classifier may be trained by supervised learning based on a set of images associated with a higher breast density and a set of images associated with a lower breast density.

Said pixels are scored as belonging to one of said classes or according to their probability of belonging to at least one of said classes.

Said quotient value may be determined for each said pixel at each of a plurality of scales in coordinate directions defined by the s and φ coordinates of said pixel, optionally as the normalised difference between eigenvalues of a Hessian matrix based on Gaussian derivatives in s and φ coordinate directions at a predetermined scale of pixels of the image, which Gaussian derivatives relate the intensity of each pixel to the intensities of the neighbours of said pixel in s and φ coordinate directions.

Such a method may comprise:

plotting said quotient values on a pre-determined model of a cluster map, said cluster map having at least two pre-plotted points;

clustering the plotted values around said at least two pre-plotted points to result in two discrete clusters; and deriving said parameter that changes alongside changes in breast density by computing the difference in area between said two clusters.

The invention includes such a method wherein the pre-determined model is defined in 3-dimensional space in which the three dimensions respectively represent the quotient value when calculated at a respective one of three different scales.

The step of clustering may further comprise: calculating which of said at least two pre-plotted points each plotted value is closest to; and assigning each value accordingly to said closest pre-plotted point to result in said two discrete clusters of plotted points.

The method may further comprise a preliminary step of preparing said pre-determined model of the cluster map incorporating said at least two pre-plotted points.

The step of preparing the model of the cluster map may comprise:

a) computing a quotient value for pixels in a test image of a breast based on the results of Hessian matrices compiled for said pixels in the image;

b) plotting each quotient value in 3-dimensional space;

c) randomly selecting at least two points amongst the quotient values as starting points;

d) calculating the distance between each quotient value and each starting point and assigning each quotient value to the starting point to which it is nearest;

e) calculating a mean of each group of points and redefining the starting point as the calculated mean point; and iteratively repeating steps d) and e) until the calculated mean point is equal to the starting point, whereby the final calculated mean points are arranged to be the pre-plotted points of the model of the cluster map.

The number of pre-plotted points may determine the number of resulting clusters and the pre-determined model of the cluster map has may suitably have four pre-plotted points. Four points may be randomly selected as starting points to result in said four pre-plotted points for the model of the cluster map.

The Hessian matrices may be derived from Gaussian derivatives of the pixels in the image. One may derive Gaussian derivates at three different scales of the image to result in three different quotient values for each of said pixels, wherein the three quotient values correspond to the three dimensions of the pre-determined model. The quotient values may then define characteristics representative of the shape of objects present in the image and a quotient value of relatively large magnitude may represent a substantially elongate object located in the image.

The present invention further extends to an instruction set comprising instructions for operating a programmable device to carry out a described method or to become a programmed device as described.

BRIEF DESCRIPTION OF THE SEVERAL VIEWS OF THE DRAWINGS

Embodiments of the present invention will hereinafter be described by way of example, with reference to the accompanying drawings, in which.

DETAILED DESCRIPTION OF THE INVENTION

We shall describe first an embodiment of the invention based on classifying pixels of an image using a trained classifier which has been trained by unsupervised learning.

Figure 1:
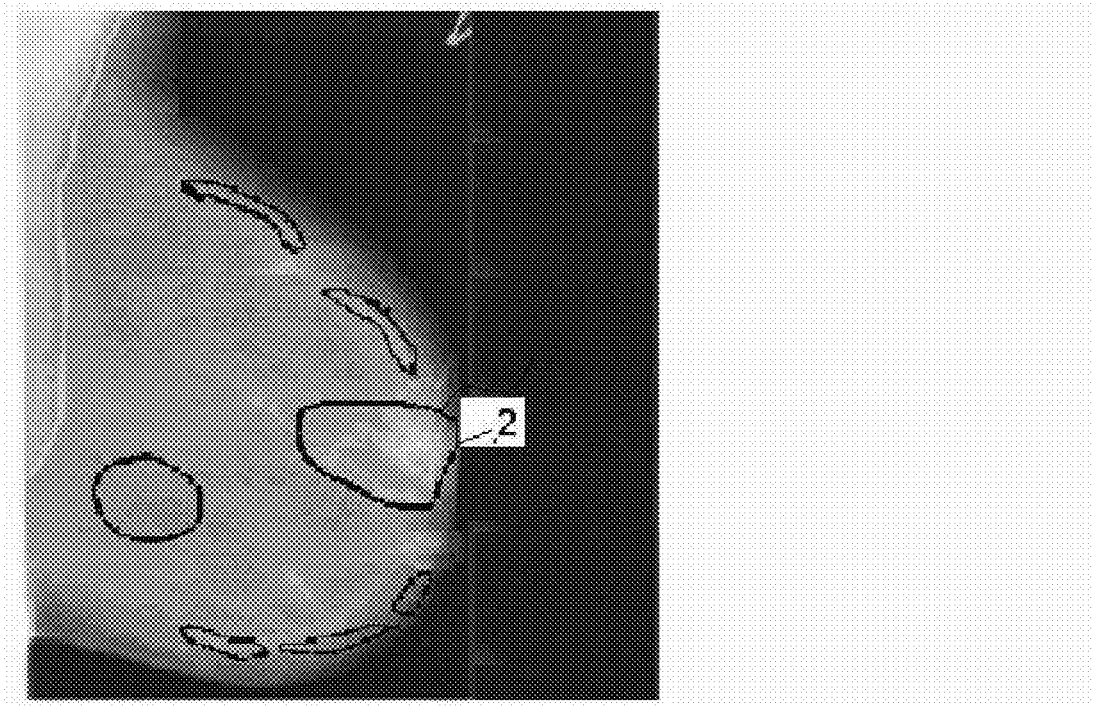
FIG. 1 is an image of a breast that shows examples of the different types of tissue that can be distinguished from a mammogram.

Numerous studies have investigated the relation between mammographic density and breast cancer risk, and women with high breast density appear to have a four to six fold increase in breast cancer risk. Therefore the density is an important feature embedded in a mammogram. In this context and as shown in FIG. 1, the density refers to a specialist's assessment (typically a radiologist) of the projected area 2 of fibro glandular tissue—sometimes called dense tissue.

Figures 2A, 2B, 2C:
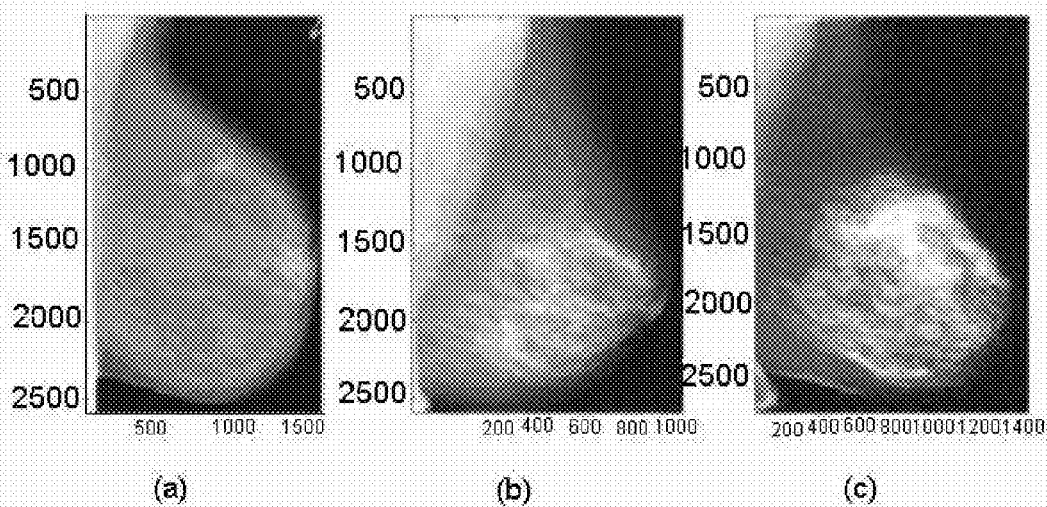
FIGS. 2A, 2B and 2C show three example mammograms depicting different mammographic densities.

As an example, FIG. 2A to 2C respectively show three example mammograms depicting low, medium and high mammographic densities.

Typically a mammogram is classified into one of four or five density categories, e.g. Wolfe patterns and BI-RADS. These classifications are subjective and sometimes crude. They may be sufficient in some cases and for single measurements, but for serial, temporal analysis it is necessary to be able to detect more subtle changes.

HRT treatment is known to increase breast density. The inventors have herein attempted to distinguish between an increase in breast density caused by HRT treatment and placebo populations.

The inventors have used pattern recognition and data mining to enable the density measurement required to give an indicative result of increased risk of breast cancer.

The first embodiment of the invention is based on the hypothesis that the breast tissue can be divided into subclasses describing its density. Each subclass should in theory relate to the anatomical composition of the surrounding breast tissue. Such labelling should be performed on the mammogram and each subclass should have some common statistical features. Following this, an unsupervised clustering algorithm with an appropriate similarity measure based on these features can be used to classify the subclasses in an unsupervised way.

Once such unsupervised clustering has been performed, it can be used to train a classifier based on which new mammograms may be labelled. After labelling the pixels in a mammogram, a score is computed from this using a second classifier. The end result of this is a pattern recognition based density classifier.

Figure 4:
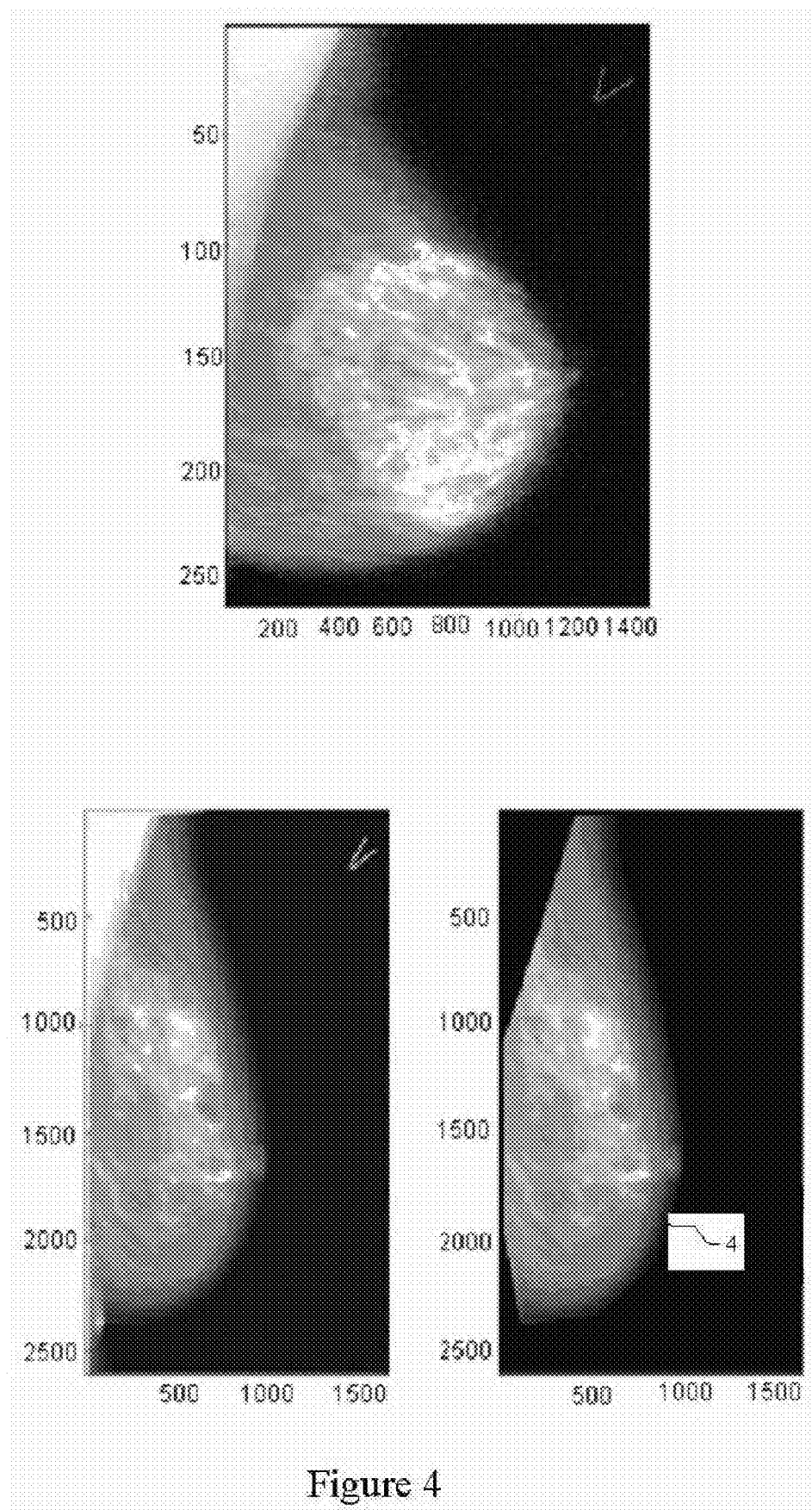
FIG. 4 shows the segmentation of an image of a breast.

A region of interest is needed in which to estimate the mammographic density. Since the density is scattered in the interior breast tissue, a fairly rough segmentation along the boundary of the breast is sufficient. The process is illustrated in FIG. 4. Delineation of the boundary may be done manually using 10 points along the boundary connected with straight lines resulting in a decagon region of interest as seen in the last panel of the figure. To ensure reproducible results, the same segmentation technique is applied to all images.

The first step is to construct a Hessian matrix of partial derivatives based on the pixel intensities of the image. Hessian matrices will be well known to those skilled in the art, however, to summarise, a Hessian matrix is a matrix of second derivatives of a multivariate function, i.e. the gradient of the gradient of a function. Therefore, the Hessian matrix describes the second order intensity variations around each point of a 3D image.

By using eigenvalues of the Hessian matrix, it is possible to characterise the second order structure of the image, that is whether the part of the image corresponds to a hill or valley. The ratio of the difference in absolute eigenvalues to their sum gives a strong response when one eigenvalue is large and the other small. This corresponds conceptually to there being a hill (or valley) in one direction, but none in the perpendicular direction. Thus, it is possible to detect that an elongated, vessel-like structure is present at that point in the image.

To compile the Hessian matrix, it is first necessary to obtain Gaussian derivatives of pixels of the image relating the intensity of each pixel to the intensities of its neighbours. It will be appreciated that the eventual results will be better if all, or nearly all, pixels are used. Gaussian derivatives are well known for their use in extracting features of computer images. Gaussian derivatives are used to extract features from the image at three different scales (in this example 1, 2 and 4 mm).

General scale space representation $$L: \mathbb{R}^N \times \mathbb{R}_+ \to \mathbb{R}$$

for any N-dimensional signal $$f: \mathbb{R}_+ \to \mathbb{R}$$

is defined by $$L(x; t) = \int_{\xi \in \mathbb{R}^N} f(x - \xi) g(\xi) d\xi$$

where $$g(x, t) = \frac{1}{(2\pi\sigma^2)^{\frac{D}{2}}} e^{-(x_1^2 + \ldots + x_D^2)/2t}$$

and the variance t is the scale parameter. Based on this representation, scale space derivatives are defined by $$L_{x^\alpha}(\cdot; t) = \partial_{x_1}{}^{\alpha 1} \ldots x_N{}^{\alpha N} L(\cdot; t) = (\partial_{x_1}{}^{\alpha 1} \ldots x_N{}^{\alpha N} g(\cdot; t)) * f$$

where $\partial_{x_i}$ denotes partial differentiation along axis i, $\alpha_i$ is the order of differentiation for axis i, and * denotes convolution. In summary, the width of the Gaussian kernel determines the scale and the differentiation is carried out on this kernel prior to the convolution to get the scale space derivative.

The Gaussian derivatives are derived so that it is possible to compare the characteristics of one pixel with its neighbour. For example, it is possible to determine which areas of the image have the same grey values by looking at the grey value of one pixel and comparing it to the grey value of the next pixel to work out a difference. If this is performed on a standard image, the results would be very sensitive to noise and there is a risk that the measurements would be impaired. By taking a Gaussian derivative, the image is de-focused, i.e. blurred to minimise the noise. While this is preferable, it is of course appreciated that other methods may be used to achieve the same results. For example, the original image could be used with further processing that accounts for this additional noise.

Use of Gaussian derivatives also allows for a choice of scales i.e. a choice of to what extent the image is blurred. In this embodiment, three different scale options are used, namely 1, 2 and 4 mm, although it will be appreciated that other scale values could possibly be used to achieve the same result.

From the Gaussian derivatives, a Hessian matrix may be constructed. The eigenvalues of this matrix describe the local structure of the image. The Hessian matrix is constructed from the partial derivatives of the image:

$$H(I) = \begin{bmatrix} \frac{\partial^2 I}{\partial x^2} & \frac{\partial^2 I}{\partial x \partial y} \\ \frac{\partial^2 I}{\partial y \partial x} & \frac{\partial^2 I}{\partial y^2} \end{bmatrix}$$

where $I(x, y)$ is the image intensity at position $(x, y)$. The combination of eigenvalues used as feature is the ratio $$q_s = \frac{L_1 - L_2}{L_1 + L_2 + \epsilon}$$

where $L_1$ is assigned the largest eigenvalue and $L_2$ the smallest of the Hessian respectively, the absolute value of both is taken before the quotient above is determined. $\epsilon$, a number much smaller than 1 is used to avoid instabilities associated with near zero division.

As explained above, this enables some mathematical definition of the characteristics of the structure, for example whether it is an elongated structure or not. For example, if there is a significant difference between $L_1$ and $L_2$, this will be reflected in the magnitude of the resulting quotient value $q_s$ that gives an indication of the aspect ratio of tissue structures in the image. For example, if $q_s$ is large, then it will be clear that the shape is elongate. Conversely, if the magnitude of the resulting $q_s$ is small, then it implies that there is little difference between $L_1$ and $L_2$ and that the structure is more circular. The denominator of the equation allows normalisation of the quotient. Therefore, the quotient measures the elongatedness in an image at a certain location $(x, y)$ at the specific scale s. It is invariant to rotation of the image and scaling intensities. The outcome of the quotient value provides an indication of intensity of the structure. For example, a negative value indicates a dark elongated structure whereas a positive value indicates a bright elongated structure.

Alternatively expressed, the Hessian at scale s is defined by:

$$H_s(I) = \begin{bmatrix} \frac{\partial_s^2 I}{\partial_s x^2} & \frac{\partial_s^2 I}{\partial_s x \partial_s y} \\ \frac{\partial_s^2 I}{\partial_s y \partial_s x} & \frac{\partial_s^2 I}{\partial_s y^2} \end{bmatrix}$$

where $\partial_s$ denotes the Gaussian derivative at scale s. As set out above, the scales used are 1, 2 and 4 mm. The features used are given by the quotient:

$$q_s = \frac{|e_1| - |e_2|}{|e_1| + |e_2|}$$

where $e_1$ and $e_2$ are eigenvalues of the Hessian at specific scale s and $e_1 > e_2$. This ratio is related to the elongatedness of the image structure at the point $(x, y)$ at the scale s that defines the image as having a "stripy" quality.

As before, this enables some mathematical definition of the characteristics of the structure, for example whether it is an elongated structure or not. For example, if there is a significant difference between $e_1$ and $e_2$, this will be reflected in the magnitude of the resulting quotient value $q_s$ that gives an indication of the aspect ratio of tissue structures in the image. For example, if $q_s$ is large, then it will be clear that the shape is elongate. Conversely, if the magnitude of the resulting $q_s$ is small, then it implies that there is little difference between $e_1$ and $e_2$ and that the structure is more circular. The denominator of the equation allows normalisation of the quotient. Therefore, the quotient measures the elongatedness in an image at a certain location $(x, y)$ at the specific scale s. It is invariant to rotation of the image and scaling intensities. The outcome of the quotient value provides an indication of intensity of the structure. For example, a negative value indicates a dark elongated structure whereas a positive value indicates a bright elongated structure.

By using the matrix to calculate quotients for every point in the image, it is possible to deduce characteristics about what sort of structure is present in the image. For example, it is possible to determine the elongatedness or fibrous nature of the surrounding tissue.

The next step is to apply k-means clustering to the derived quotient values. K-means is a popular way to perform unsupervised clustering of data. It is employed to divide a mammogram into four structurally different areas (described below). Subsequently, based on the size of the areas, a density score is determined. As explained below, this score is a linear combination of areas that maximise the separation of HRT and placebo patients.

It is an approximate method to find the unknown mean vectors of a multivariate distribution. The rationalisation behind this is that if a point is close to the mean of a class or cluster, the probability that it belongs to that cluster is high. This probability is based on the statistical characteristics of each point.

Figure 6:
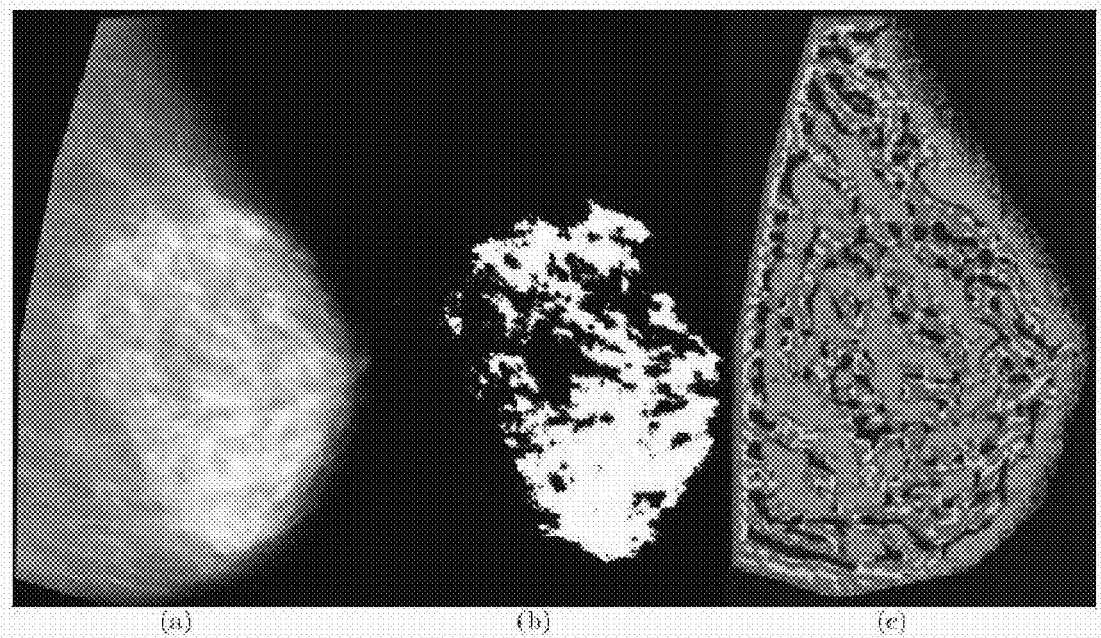
FIG. 6 shows an illustration of automatic thresholding and stripiness.
Figure 7:
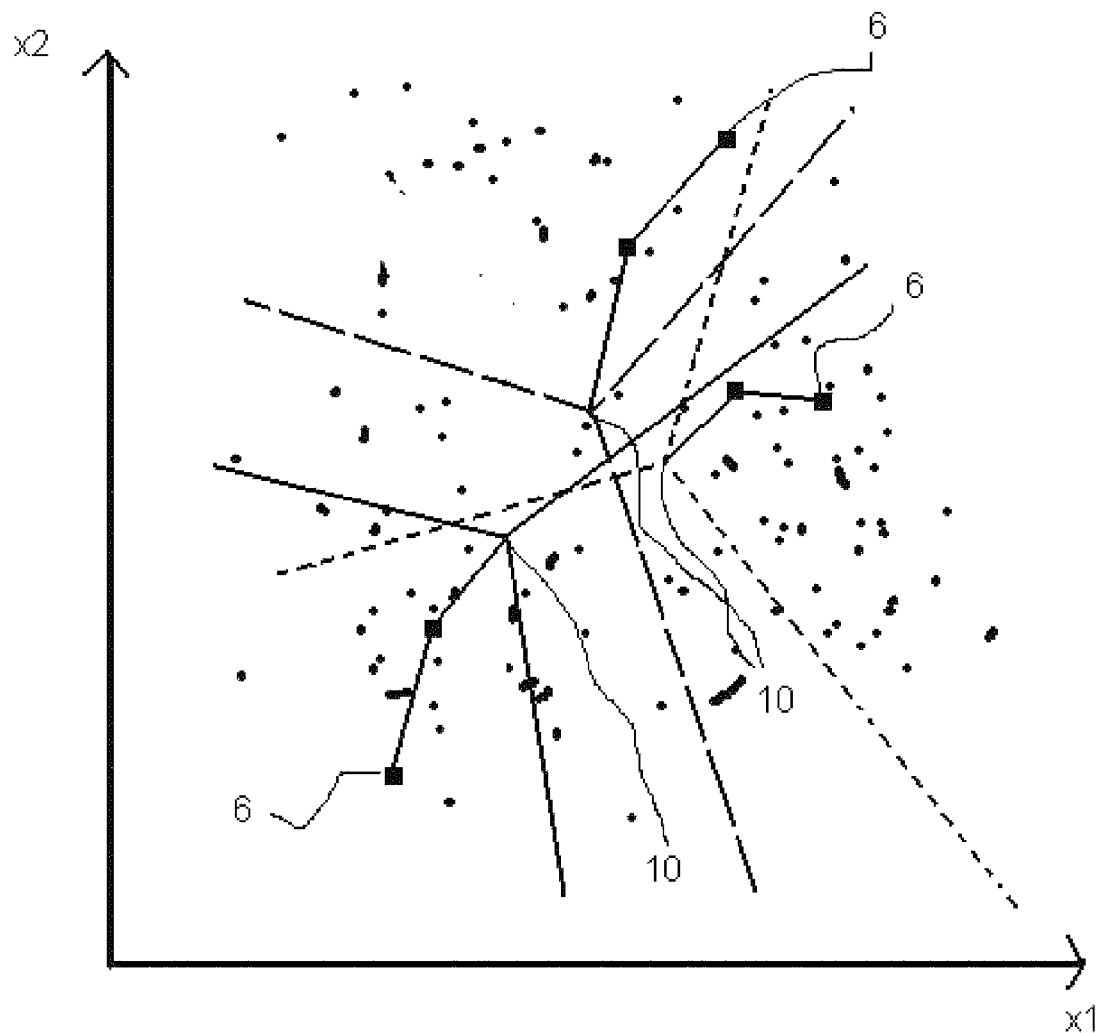
FIG. 7 shows trajectories for the means of the k-means clustering procedure applied to two-dimensional data.

A visualisation of the threshold and stripiness methods is shown in FIG. 6. Each quotient value is plotted in 3-dimensional space, where for each pixel, 3 quotient values are determined relating to the three different scales of Gaussian derivatives. For example, the x-dimension may be used for 1 mm, the y-dimension for quotient values determined at 2 mm and the z-dimension for 4 mm. An example of this process is shown in FIG. 7 on a 2-dimensional axis. Three starting points 6 that are not too close to each other, within the three axes, are chosen at random. It should be appreciated that three points are chosen in this embodiment to result in three clusters. However, any number of starting points could be chosen depending on the desired number of clusters. In a preferred embodiment, four starting points would be selected.

The algorithm below is then performed iteratively. The algorithm involves identifying for each quotient, which of the three random starting points is nearest. Each quotient is then effectively "affiliated" with the point to which it is closest and it is notionally classified as belonging to the same group. The same procedure is performed for each quotient, until each quotient belongs to one of the four starting points. For each resulting group of quotients, a mean is calculated and the mean quotient value is assigned as the new starting point 8, thus resulting in three new starting points.

```
Initialize n, c, μ₁, μ₂, ..., μ_c.
repeat
    classify n samples according to nearest μ_i
    recompute μ_i
until no change in μ_i
return μ₁, μ₂, ..., μ_c
```

The algorithm is performed iteratively until there is no change between the starting point and the resulting mean point. These three points 10 become the cluster points that will be used for future detection.

These cluster points may then be used to obtain a density score. In the training phase, a large collection of randomly chosen pixels from the different images in the data set are used to generate a representative collection of features. Preferably, these features are divided into four clusters using k-means clustering. The means are stored and used for nearest mean classification. In the testing phase, this nearest mean classifier is used to score each mammogram as follows:

Extract Hessian-based features
Classify each pixel in one of four classes using the nearest mean classifier
Determine relative areas of the classes
Compute the score from those areas.

Figure 8:
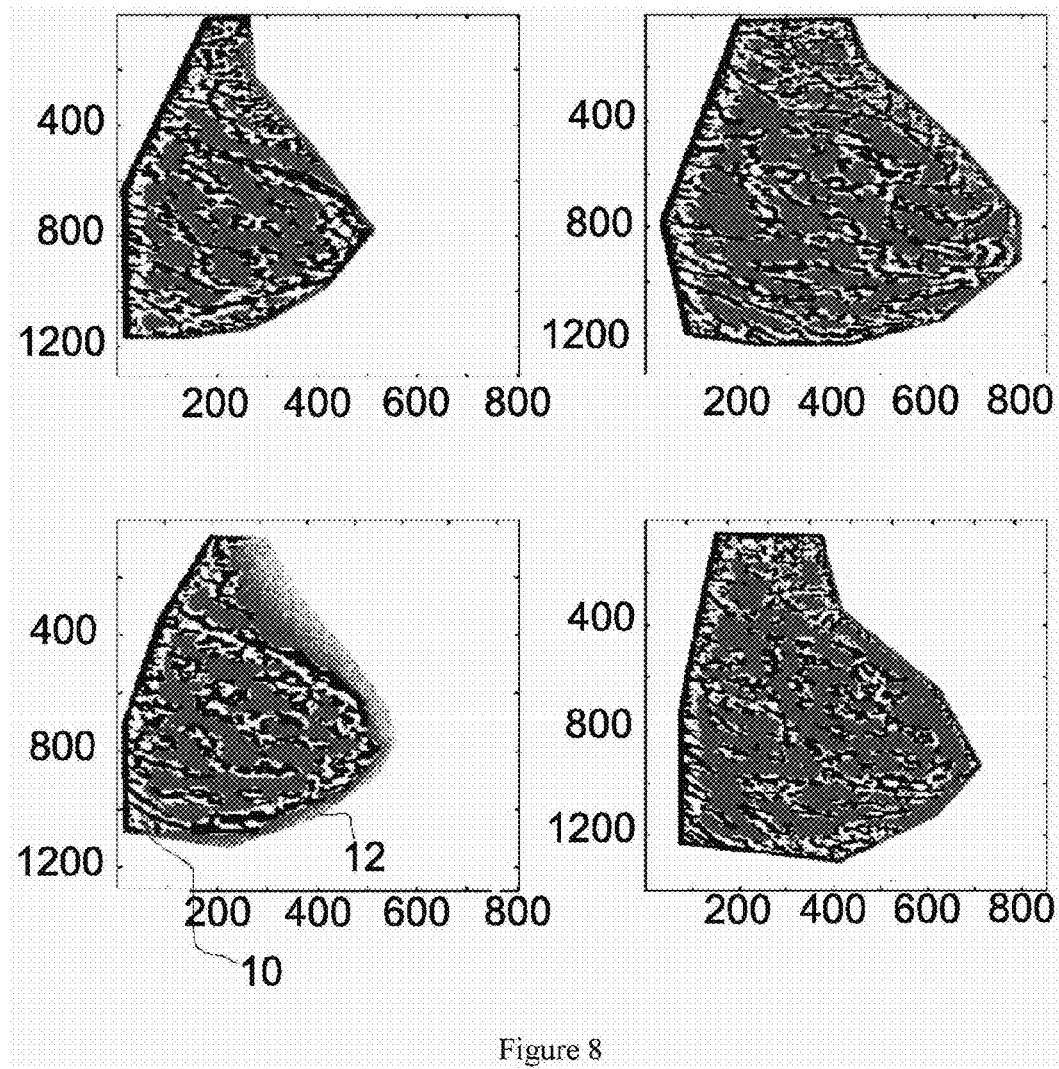
FIG. 8 shows four segmented breast images indicating the different clusters.

To summarise, Hessian matrices are prepared for each Gaussian variable scale and quotient values obtained for each pixel. As there are three possible scales, each pixel has three different quotient values. The quotient values (for values of one scale at a time) are plotted alongside the four cluster means derived from the k-means clustering. Each quotient is assigned to the cluster mean that it is nearest to resulting in four real clusters. Each cluster mean will be representative of the different characteristics of the breast tissue. The result of classifying the pixels of an image into each of four classes is shown in FIG. 8, one panel per class.

The area of each cluster is determined and from this a score is obtained that utilises the difference in density between the different areas. The final score is based on a linear combination of the relative areas of the classes in the breast image. The optimum is determined using a linear discriminant analysis given the HRT group and the placebos. This optimal linear combination corresponds roughly to "2×Area1−1×Area2".

To arrive at this rule, a linear discriminant analysis (LDA) on the breast area features was employed. LDA is a standard statistical pattern recognition technique which can be used to discriminate between two or more classes. In the first instance, the aim of this method is to discriminate between HRT and placebo. LDA results in a decision rule that uses a linear combination of its input features. The remaining two areas contributed only with small co-efficients that could be left out.

From this LDA, the two Areas 1 and 2, required for this calculation can be determined. The LDA determines which of the areas should be used for the above calculation based on the characteristics in the different clusters. This should be known to those in the art and will therefore not be further described herein.

By using the methods described above to extract features, compute clusters and construct a nearest means classifier to assign new image pixels to clusters, it is possible to obtain a new set of data consisting of labelled images. First a million pixels are selected at random among the images in the data set for feature extraction. The extracted features are normalised to zero mean and unit variance. Then the k-means algorithm is applied and a classifier (NMC) is constructed from the four estimated mean vectors. This classifier is applied to the feature versions of all the images to get a new data set.

Each image in this new set consists of background and breast tissue that has been divided into four classes. These classes are tested as density measures separately and together using a linear classifier. A linear classifier is used because it generalises and is simple. The density score is the signed distance to the decision hyper-plane. The evaluation of the density measure is done in a leave one out approach. The linear classifier is trained on the N−1 images and used to predict if the remaining image is from a HRT or a placebo patient.

The ability of a certain combination of views to separate the HRT group from the placebo group is evaluated with an ROC area score. ROC stands for "Receiver Operating Characteristic". ROC curves depict the performance of a diagnostic test. The y-axis is sensitivity and the x-axis is specificity.

The feature used for separation is the temporal change in density, $\Delta D = D_x - D_y$, where x and y refer to the density of images from different years. If one view is used, a patient is represented by one feature and similarly if two views are used, two features characterise each patient. To construct the ROC curves, it is necessary to calculate the likelihood of being an HRT patient from the feature(s). From basic Bayesian decision theory, the probability that an observed feature vector x belongs to class j, denoted $p(w_j|x)$ is given by $$p(w_j | x) = \frac{p(x | w_j) P(w_j)}{p(x)}$$

where $p(w_j|x)$ is known as the posterior probability, $p(x|w_j)$ the likelihood and $P(w_j)$ the prior. Since it is desired to compare probabilities and select the highest $p(w_j|x)$ it is possible to ignore the common denominator. This leads to a decision function of the form $$d_j(x) = p(x|w_j) P(w_j)$$

where it is possible to classify as HRT if $d_{HRT}$ is larger than $d_{placebo}$ and vice versa.

Figure 9:
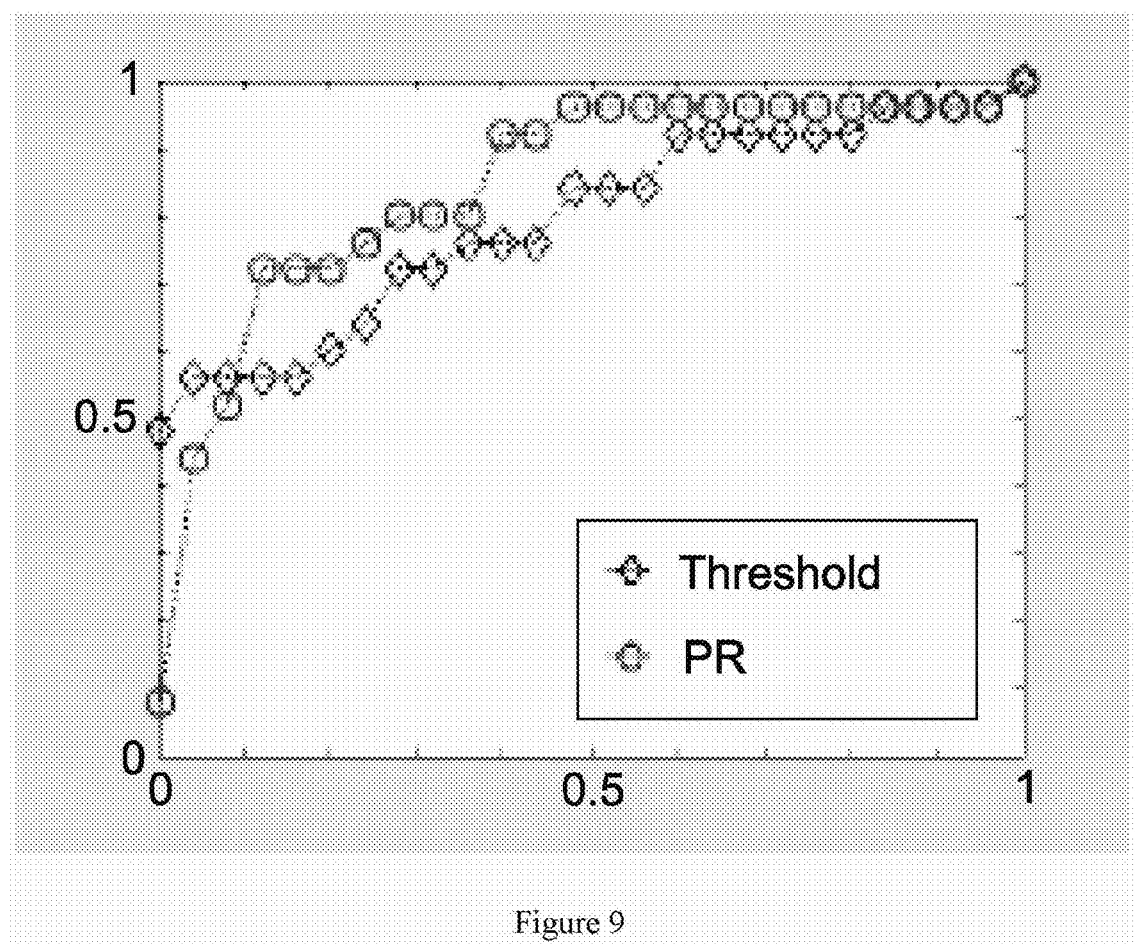
FIG. 9 shows a comparison of the ROC curves resulting from the pattern recognition based density measure and those resulting from the adaptive threshold measure.

Shown in FIG. 9 are the resulting ROC curves from using the described pattern recognition based density measure ("PR density"—circles) compared to the previously known adaptive threshold ("TH density"—diamonds) method. It shows that the PR density does a better job at classifying the patients into HRT and placebo groups. In terms of p-values the two measures are comparable, but again the PR-density is slightly better. When checking if the density means of the HRT group in 2001 is significantly higher than in 1999, the TH-measure yields a p-value of 0.002 and the PR measure 0.0002.

In the analysis of the density measurements, the patient populations were divided into subgroups. HRT at beginning of study (H99), HRT at end of study (H01), placebo at beginning of study (P99), and placebo at end of study (P01). Ttests were performed on four subgroup combinations. Unpaired ttests on P99 vs H99 and P01 vs H01. Paired ttests on P99 vs P01 and H99 vs H01. The zero hypothesis is in each case that the two tested subgroups have identical density means, and the alternative hypothesis that they have different density means. This can be seen in the table below:

|  | Test | | | |
|---|---|---|---|---|
| Method | P99 vs P01 | H99 vs H01 | P99 vs H99 | P01 vs H01 |
| BI-RADS | 0.3 | <0.001 | 0.3 | 0.1 |
| Interactive TH | 1 | <0.001 | 0.8 | 0.02 |
| Automatic TH | 0.07 | <0.001 | 0.8 | 0.2 |
| Stripiness | 0.9 | 0.004 | 0.9 | 0.02 |

This table displays the p-values for the different tests. As can be seen, no method separates the P99 and P01 groups significantly. More importantly, no method separates the P99 and H99 groups, confirming successful randomisation of the trial. All methods are able to separate H00 and H01 to a very high degree of significance. Only the interactive percentage density and the stripiness (present invention) significantly separate H01 from P01.

Thus, unsupervised clustering of mammograms based on the quotient of Hessian eigenvalues at three scales result in tissue classes that can be used to differentiate between patients receiving HRT and patients receiving placebo. It is an automated method for measuring the effect of HRT as structural changes in the breast tissue. This measure can be interpreted as an intensity variant form of HRT induced structural density. Furthermore, the interactive threshold shows better capability to separate the HRT patients from the placebo patients at the end of the study than the categorising BI-RADS methodology.

It is possible to separate the HRT patients from placebo patients to a very high degree using the proposed measure of structural density.

This approach using unsupervised learning to train the classifier may therefore be summarised as follows:

Training Phase [Based on Several Images]

1. Feature extraction: For all images, for preferably every pixel, at three scales, extract Hessian matrix and calculate the three "stripiness" quotients form those.

2. Clustering: Assign every feature vector of three quotients [or a large enough subset of these feature vectors] to one of K groups using K-means clustering; in particular, we take K=4.

3. Train classifier: determine the means of the K groups and associate one of K labels with every single one of the groups, i.e., we train a nearest mean classifier.

Test Phase [for a New Image or Image Not Used in the Training Phase]

A. Feature extraction: For the image, for preferably every pixel, at the three same scales, extract Hessian matrix and calculate the same three "stripiness" quotients form those.

B. Classification/labelling: Using the trained nearest mean classifier, assign one of the K=4 labels to every pixel based on its associated feature vector.

C. "Density" score calculation: Determine the relative area in the breast for all of the K=4 classes and use the rule 2×Area1−1×Area2

In an alternative approach, we use a classifier trained by supervised learning.

Figure 3:
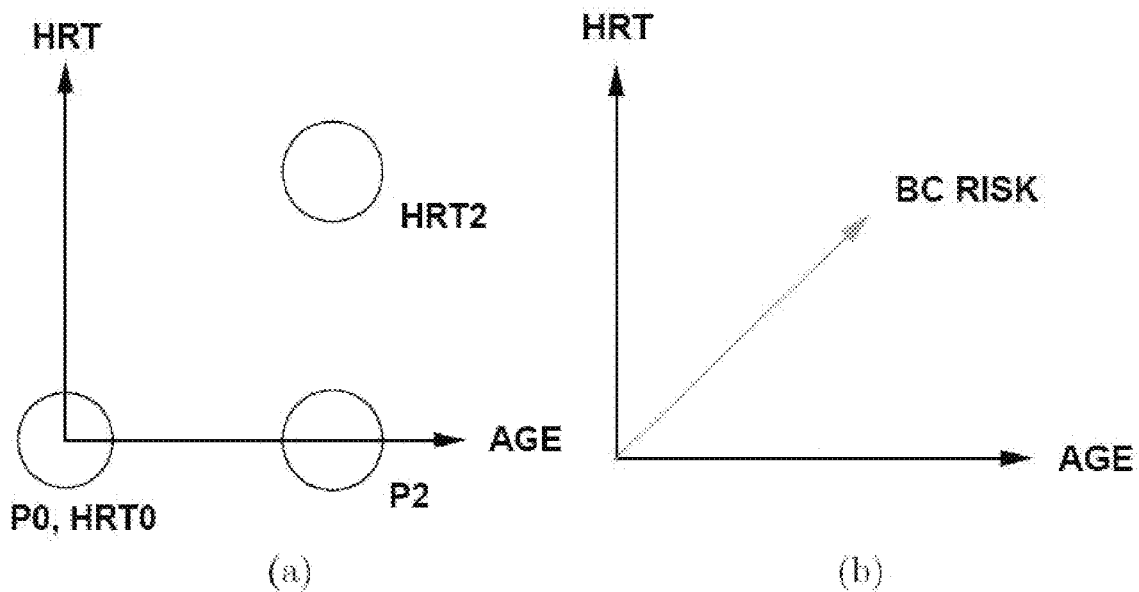
FIG. 3 illustrates the different effects of changes in breast density.

The inventors perceive breast density as a structural property of the mammogram that can change in various different ways explaining different effects. As can be seen in FIG. 3, the different effects are shown with respect to hormone replacement treatment and age. Each circle shown in FIG. 3(a) represents a probability density cloud for the patient groups receiving placebo and HRT at a start time $t_0$ and a later time $t_2$ respectively. Aging and HRT treatment are hypothesised to be two different effects. Breast cancer risk may be yet another dimension, as illustrated in FIG. 3(b).

The method described next is derived from observing the biological effect in a controlled study. The method is constructed to observe any one specific physiological effect and is invariant to affine intensity changes. Accordingly, digitised mammograms from an HRT study were examined in an example below to see if the effect of aging and HRT treatment are indeed two different effects.

The study population was a randomly chosen subpopulation from a 2-year randomised, double-blind, placebo-controlled clinical trial in which the participants received either 1 mg 17 β-estradiol continuously combined with 0.125 mg trimegestone (n=40), or placebo (n=40) for 2 years. At entry into the study, women were between 52 and 65 years of age, at least 1 year postmenopausal with a body mass index (BMI) less than or equal to 32 $kg/m^2$.

Breast images were acquired at the beginning ($t_0$) and the end of the 2-year treatment period ($t_2$) using a Planned Sophie mammography X-ray unit. The images were scanned using a Vidar scanner to a resolution of approximately 200 microns with 12 bit grey-scales. Delineation of the breast boundary connected with straight lines, resulting in a decagon region of interest. Only the right mediolateral oblique view was used, since it has been shown that a reliable measure of the breast density can be assessed from any one view.

Since HRT has been shown to increase mammographic density, these images can be used to evaluate density measures by their ability to separate the HRT and placebo populations. Furthermore, aging effects can be detected by comparing the placebo group at $t_0$ and $t_2$. In the following, the groups are donated as P0, P2, H0 and H2 for placebo and treatment at $t_0$ and $t_2$ respectively.

The aim was to establish a new density measure based on data-mining of patient groups and machine learning. This approach is based directly on the image data and is as such independent of radiologist readings. It does require data expressing change in density and a selection of features to use. A pixel classifier is used, since it is desired to learn the local appearance of dense tissue. The large overlap between classes on pixel level (both dense and non dense mammograms have many similar pixels, and also both dense and non dense mammograms appear in both the placebo and HRT population) disappears to a large degree when fusing the pixel probabilities to a single posterior for the image.

Two collections of images (A and B) are given together with a suitable feature space. Features are sampled in a large number of positions from each image. In this way each image is represented by a set of features. The sets are combined into two subgroups representing the collections A and B to provide a basis for classifier training. A nonlinear classifier is trained on this basis and used to compute probabilities of belonging to either A or B for all pixels in all images. These posteriors are then fused to one posterior probability for each image.

There are some considerations regarding the nature of a suitable feature space for the particular setting of x-ray mammography. Certain properties are desirable, specifically invariance to transformations, which do not relate to the underlying signal, and low noise sensitivity.

Looking at historical, multi-site data, one would like features to be invariant to the monotonic transformations caused by variations in film material, development and digitisation. Processes, such as change in x-ray tube voltage, may induce non-monotonic intensity changes, potentially altering the tissue appearance radically. One cannot expect to gain invariance with respect to these changes, but only create measurements that are robust to this type of variations. Hence macroscopic shape measurements are excluded, and the measurements are restricted to local features of the image. Since local orientation and position may be changed due to variations in compression direction and amount, only local features that are invariant with respect to Euclidean transformations are used. These will also be invariant to effects caused by small translational variations in positioning.

The noise in the images is assumed to be uncorrelated point noise caused by a mixture of Poisson and Gauss processes. The presence of noise means one can not rely on pure analysis of isophotes and some robustness of the features with respect to which noise is needed.

Here, following determination of the $q_s$ values as described previously, based on the stripiness features, the density measure is derived by training a pixel classifier on subsets of image data in a supervised learning procedure. The subsets may respectively comprise images expected to have a lower density as one subset and images expected to have an increased density as a second subset. For instance in a study where a group of women are divided into a treatment group H for HRT treatment and a placebo group P and are both followed over a time period running from $t_0$ to $t_2$, suitable subsets of interest include subsets devised such that there should be some detectable change in density. Four combinations of subgroups are used in this example:

HRTL (Longitudinal)

Subsets H0 (group H at time $t_0$) and H2 (group H at time $t_2$) are used to capture the effect of HRT. There is also an effect of aging, but it is expected to be much lower than that of HRT. The trained classifier is referred to as HRTL.

HRTC (Cross-Sectional)

Subsets P2 (placebo group P at time $t_2$) and H2 are used to capture the effect of HRT. Separation between classes is expected to be lower, since inter-patient biological variability is diluting the results. The trained classifier is referred to as HRTC.

Age

The baseline population (P0 (placebo group P at time $t_0$) and H0) is stratified into three age groups, and the first and last tertile are used to capture the effects of age. The second tertile is used as control population. The trained classifier is referred to as AGE.

PlaL (Longitudinal)

Subsets P0 and P2 are used to capture any effect of non-affine, time dependent image changes. If no such changes are present in the images, this selection of subsets will also yield an age classifier. The trained classifier is referred to PlaL.

In each case the two subgroups get a distinct label and a k nearest neighbours (kNN) classifier is trained to separate pixels from the two classes.

We have applied this to the study population from the 2 year trial. Due to the limited number of patients, the data was not split up into a training and a test set. Instead the classifier was trained on all but a pair of images (one image from each class) and pixel probabilities are computed for this pair using the trained classifier. This is repeated until all pixel probabilities for all images are computed. This technique is similar to leave-one-out, but is modified to leave-two-out since leaving one sample from class A out introduces a bias for belonging to class B, especially when the number of samples are relatively low (80 for the HRT classifiers and 56 for the age classifier). Feature vectors are extracted from 10,000 randomly selected pixels within the breast region in each image.

Figure 5:
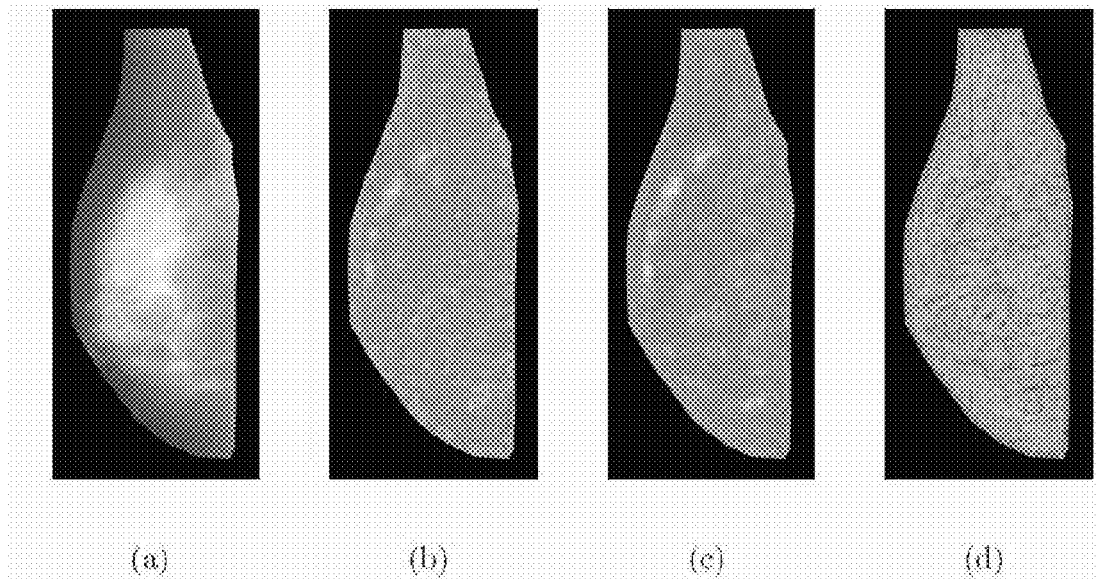
FIG. 5 shows an example of a mammogram with corresponding pixel probability maps for pixel classification using the classifiers HRTC, HRTL and AGE.

To go from pixel density probabilities to patient density scores, the average pixel probability within the breast area is used. Several other fusion schemes for combining the posterior probabilities of the pixels to a single posterior for the image are possible, including e.g. voting and maximum rule. In general it cannot be said that one is better than the other and no real benefit is expected from using different fusion rules. It is expected that the min and max rule performs poorly since most often an image will contain at least one pixel for each of the extreme values 0 and 1, making separation based on these rules impossible. An example of a mammogram with corresponding pixel probability maps is shown in FIG. 5. Specifically, FIG. 5(a) shows a mammogram from the data set described above and FIGS. 5(b), (c), and (d) show the pixel classification result using the classifiers HRTC, HRTL and AGE respectively.

FIG. 6 illustrates the effect of automatic thresholding and "stripiness" and shows a) a starting mammogram, b) thresholded density, and c) the tissue clustering described above that is used to get the stripiness density.

Figure 10:
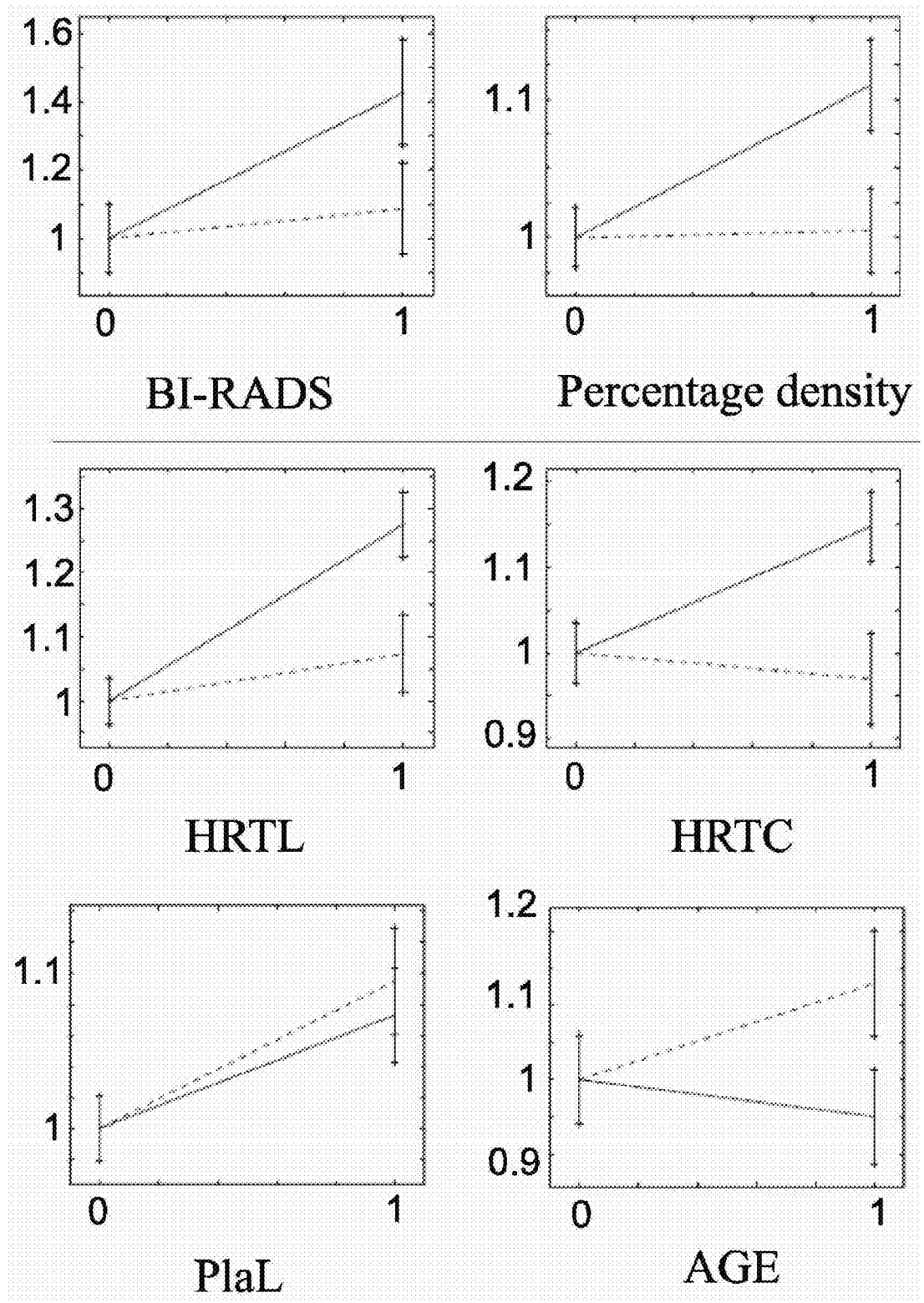
FIG. 10 illustrates the relative longitudinal progression of the different measures of an embodiment of the invention.

The table below shows p-values for all combinations of methods and relevant pairs of groups. The first two columns are paired two-sided t-tests, while the last two columns are unpaired. All three classifiers are based on the same feature set consisting of 10,000 feature vectors for each image, enabling a direct comparison of the methods. FIG. 10 shows the relative density changes using the three different training strategies. Specifically, FIG. 10 shows the relative longitudinal progression of the different measures. The placebo group is indicated with a dashed line and HRT by a solid line. Vertical bars indicate the standard deviation of the mean of the subgroups at $t_2$ and of the entire baseline population at $t_0$.

| Method | Test | | | |
|---|---|---|---|---|
| | P0 vs. P2 | H0 vs. H2 | P0 vs. H0 | P2 vs. H2 |
| BI-RADS | 0.3 | <0.001 | 0.3 | 0.1 |
| Interactive TH | 1 | <0.001 | 0.8 | 0.02 |
| HRTL | 0.08 | <0.001 | 0.7 | 0.01 |
| HRTC | 0.4 | <0.001 | 0.7 | 0.01 |
| Age | 0.004 | 0.4 | 0.8 | 0.07 |
| PlaL | 0.003 | <0.001 | 0.4 | 0.6 |

Figure 11:
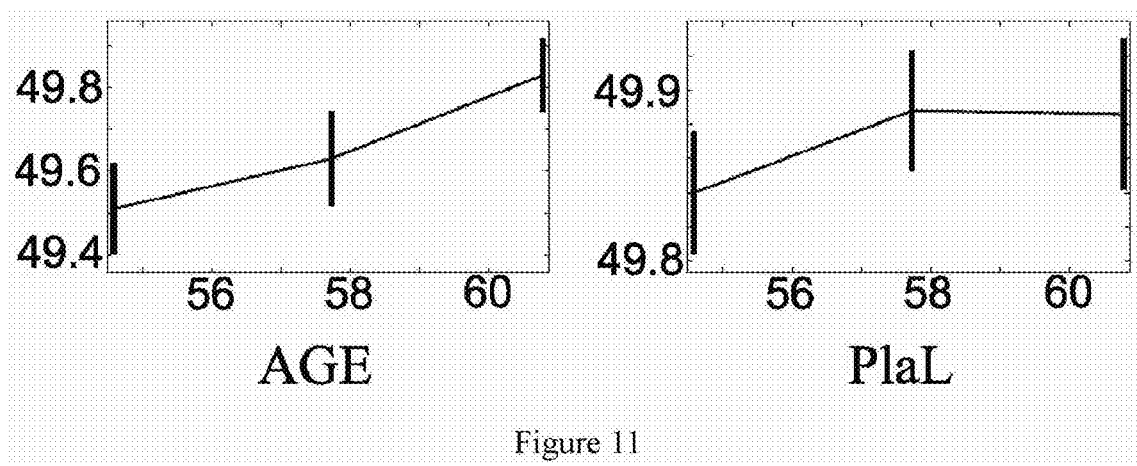
FIG. 11 illustrates the aging density as a function of age in tertiles in the baseline population including standard deviation of the mean.

FIG. 11 examines if the differences between P0 and P2 indicated by the AGE and PlaL classifiers are indeed age effects or a difference in imaging at baseline and follow-up. The baseline population is stratified into three age groups. The AGE measures are significantly different (p=0.015) in the first and last tertile. The PlaL measure shows neither an increasing trend nor significant difference in measurements. These results support that AGE captures aging effects and PlaL detects general differences in images between $t_0$ and $t_2$.

Assuming that PlaL is mainly detecting general image changes from $t_0$ to $t_2$, AGE is the only method significantly detecting the effect of aging. The relatively low p-value for the separation of P0 and P2 detected by HRTL (0.08) is most likely due to the time dependent changes also influencing this other longitudinally trained classifier. These changes are further indicated by the performance of the PlaL classifier, which give similar changes in average image posterior for both the placebo group and the HRT group.

The inverse appearance of HRTC and AGE changes on FIG. 10 suggests that the age-related density and the HRT-density occur along directions in the Hessian-based feature space that are not orthogonal, but rather somewhat pointing in opposite directions. This behaviour is in agreement with density increasing with HRT and decreasing with age.

Thus this method using supervised learning to train the classifier may be summarised as follows:

Training Phase [Based on Several Images]

1. Feature extraction: For all images, for preferably every pixel, at three scales, extract Hessian matrix and calculate the three "stripiness" quotients form those.

2. Train at least one classifier:

Based on the stripiness features, the density measure is derived by training a pixel classifier on subsets of the available data. The subsets are devised such that there should be some detectable change indensity between them. Four combinations of subgroups are illustrated above.

In each case the two subgroups get a distinct label and a k nearest neighbours (kNN) classifier [Boyd 2005] is trained to separate pixels from the two classes.

Test Phase [for a New Image or Image Not Used in the Training Phase]

A. Feature extraction: For the image, for every pixel, at the three same scales, extract Hessian matrix and calculate the same three "stripiness" quotients form those.

B. Classification/labelling: Using the trained kNN classifier, assign a posterior probability to every pixel based on its associated feature vector.

The posterior probability, a number between 0 and 1, indicates how much a pixel belongs to one group or the other. For instance, in the specific example described above if the HRTC classifier assigns a high posterior to a pixel, it indicates that this pixel "looks" like a pixel from an image in the HRT treated patient set.

C. "Density" score calculation: Determine the overall density score by averaging the posterior probabilities over the whole breast region. This average determines the score for that breast image. The score will be a number between 0 and 1. What this number indicates is of course dependent on which classifier is used: e.g. HRTL, HRTC, AGE, etc.

Indeed, with the supervised method we not only demonstrate that we can separate HRT and non-HRT better, but that we can also learn/train other "density" scores. E.g. it appears that AGE tells us something about age progression.

If the method as described above either using supervised or unsupervised learning to train the classifiers is repeated on an image of the same breast some time later, for example, 1 or 2 years in accordance with typical breast screening programmes, it would be possible to compare the differences between the derived density scores to detect differences. In this respect, if the density score has increased, it is probable that the risk of breast cancer has also increased.

There follows a second example of the practice of the invention.

The aim of this example is to provide a framework for obtaining more accurate and sensitive measurements of breast density changes related to specific effects. Given effect-grouped patient data, we propose a statistical learning scheme providing such a non-subjective and reproducible measure and compare it to the BI-RADS measure and a computer-aided percentage density.

Several approaches to other automatic methods for assessing mammographic breast density have been suggested [Boone 1998, Karssemeijer 1998, Byng 1996, Tromans 2006, Petroudi 2006]. All of these aim at reproducing the radiologist's categorical rating system or at segmenting the dense tissue to get a percentage density score. Our approach differs from existing methods in mainly three ways Breast density is considered a structural property of the mammogram, that can change in various ways explaining different effects.

The measure is derived from observing a specific effect in a controlled study.

The measure is invariant to affine intensity changes.

It is noted that we do not aim at measuring what is traditionally called breast density, i.e., the relative amount of fibroglandular tissue. Since the term mammographic density is most often used for this type of measure, we have decided to use "mammographic pattern" to describe more general properties of the mammogram. We mean to demonstrate that mammographic changes can perceived as a structural matter that may be accessed ignoring the actual brightness of the images and that it changes differently under the physiological processes of aging and HRT.

The data used in this work is from a 2-year randomized, double-blind, placebo-controlled clinical trial, in which the participants received either 1 mg 17β-estradiol continuously combined with 0.125 mg trimegestone (n=40), or placebo (n=40) for 2 years. At entry into the study, women were between 52 and 65 years of age, at least 1 year postmenopausal with a body mass index less than or equal to 32 kg/m2.

Breast images were acquired at the beginning (t0) and the end of the 2-year treatment period (t2) using a Planmed Sophie mammography X-ray unit. The images were then scanned using a Vidar scanner to a resolution of approximately 200 microns with 12 bit gray-scales. Delineation of the breast boundary on the digitized image was done manually by an expert using 10 points along the boundary connected with straight lines. Only the right mediolateral oblique view was used, since it has been shown previously that a reliable measure of the breast density can be assessed from any one view [Byng 1996]. We denote the patient groups P0, P2, H0, and H2 for placebo and treatment at t0 and t2 respectively.

Breast imaging reporting and data system (BI-RADS) is the four category scheme proposed by the American College of Radiology. The BI-RADS categories are: 1) Entirely fatty; 2) Fatty with scattered fibroglandular tissue; 3) Heterogeneously dense; 4) Extremely dense. A trained radiologist assigns the mammogram to one of these categories based on visual inspection. It is included here since it is widely used both in clinical practice and for automated and computer aided approaches [Boyd 2005].

In the Interactive threshold method referred to below the reading radiologist determines an intensity threshold using a slider in a graphical user interface. She is assisted visually by a display showing the amount of dense tissue corresponding to the current slider position. The system is similar to the approach proposed by Yaffe [1994] and has been used in several clinical trials [Boyd 2005]. The density is defined as the ratio between segmented dense tissue and total area of breast tissue.

Our mammographic pattern measure is derived by training a pixel classifier on subsets of images from the available data. These subsets are chosen to represent the potential differences in patterns to be detected by the method. As an example, one subgroup may be the H2 images from hormone treated patients and the other the P2 images from the placebo group.

Most often, as in our case, the pixel classification would be based on local features that describe the image structure in the vicinity of every pixel to be classified. Generally, the features extracted per pixel will exhibit large similarity for every image even though they may come from two different subgroups of images. Therefore, for individual pixels, it will be difficult to decide to which of the subsets it belongs. Fusing all weak local decisions, however, into a global overall score per image ensures that sufficient evidence in favor of one of the two groups is accumulated and allows for a more accurate decision.

In this work, a simple fusion strategy is employed. After every pixel has been provided with a posterior probability by the classifier, the average probability per pixel in the image is determined. This mean is then taken as the final score. Obviously, several other fusion schemes are possible (see e.g. [Jain 2000]), but we do not necessarily expect benefit from these. Below follows a more precise description of the features and a description of the various subgroups used to train the classifiers.

We now present a framework for incorporating feature selection in our supervised methodology. This framework is applied to a set of data from the Dutch national breast cancer screening program. The presented results demonstrates the ability and potential of including feature selection to improve and specialize measures.

Above we showed that the stripiness features performed well on HRT data, both in an unsupervised and a supervised setting. Obviously, these features are not expected to perform well in all situations and, generally, the performance of our method may improve by allowing more features. However, indiscriminately adding features will eventually deteriorate the results. One way to cope with this situation is by means of a feature selection strategy.

A somewhat related study was carried out by Huo et al. [Huo 2000], where 14 image features are related to measures of breast cancer risk. They employ linear discriminant analysis is to identify features that are useful in differentiating between low-risk women and BRCA1/BRCA2-mutation carriers. Linear regression analysis is employed to identify useful features in predicting the risk, as estimated from the [Gail 1989] and [Claus 1994] models. They find that women at high risk tend to have dense breasts and their mammographic patterns tend to be coarse and low in contrast.

The study presented here differs from the work by Huo et al. in various ways. The main differences are that we investigate local features not global and that we evaluate on a large set of mammograms from women who were actually later diagnosed with cancer versus a similar set of controls. We find local mammographic features, mainly describing the structure around the vertical axis and the position in the breast, which are indicative of women developing cancer (AUC=0.70). The feature with the highest association of risk found by Huo et al., histogram skewness, was less indicative (AUC=0.60).

We do not just use all the features we can think of because of the problem of overfitting to consider. If one uses enough features and a powerful classifier it is possible to separate almost anything, but the resulting classifier loses the ability to generalize to new data, since the demand of samples grows exponentially with the dimensionality of the feature space [Jain 2000]. This problem is also known as the "curse of dimensionality" and implies that only a limited number of features may be used effectively, depending of the number of samples in one's data set.

The goal of feature selection in pattern recognition is to select the most discriminative features from a given feature set to improve classification performance. Through the process of feature selection, we can potentially accomplish the following:

Improved classification performance.

Better understanding of the relationship between features and classes.

Less computing resources needed for building (and, depending of type, running) the classifier.

The first two improvements are of special interest to us, since we are ultimately interested in identifying the features most indicative of breast cancer risk. The aim of feature selection can be stated more formally as follows. Given a feature set F, we construct a classifier with a recognition rate R(F') as a function of the selected features, F'. The goal of feature selection is to select the subset F' of F such that R(F')>R(T), where T denotes all possible subsets of F. Several choices are available for quantifying the recognition rate, including specificity, sensitivity, area or volume overlap of a segmentation task, and area under ROC curve to name a few. Which choice to make depends on the application. It should be noted that, independent of choice, it is important to evaluate the recognition rate on data that are independent of the training data. This is typically done, either by splitting the data up in train and test sets or use a leave-one-out approach for evaluating the recognition rate [Jain 2000].

Among other things, due to the combinatorial explosion, there is generally no efficient way to determine the theoretically optimal feature set and we have to resort to suboptimal approaches, which typically determine a theoretically suboptimal feature set. An introduction to and overview of the different ways of approaching this problem is available in reference [Guyon 2003]. In our current approach, we employed a basic sequential forward selection method, as originally proposed by Whitney [1971]. It is one of the commonly used heuristic methods for feature selection and involves the following steps:

Select the first feature that has the highest recognition rate among all features.

Select the feature, among all unselected features, that gives the highest recognition rate together with the selected features.

Repeat the previous step until you have reached a preset number of features, until the recognition rate exceeds a preset threshold, or until all features are selected.

In addition to the stripiness features previously presented, we propose a set of position features based on a distance map of the breast boundary. Two additional types of features are considered for providing a large set of descriptive features selectable in the feature selection process. One is the set of invariant, differential features proposed by Romeny et al. [1994] that, in principle, describe all local intrinsic properties of a scalar image at a fixed level of resolution. The other is the set of local, partial derivatives up to order n, commonly referred to as the n-jet. The jets are useful descriptors of local image structure, shown to be related to the processing of the visual system [Koenderink 1987].

With regard to polynomial invariants, the gauge coordinate frame (v,w) is defined such that w is everywhere along the gradient direction and v tangential to the isophote. These two directions are always perpendicular to each other and form a local coordinate frame. All polynomial expressions in (v,w) are invariant under orthogonal transformations [ter Haar Romney 1994]. As one feature set we test all non-singular polynomial invariants up to third order resulting in 8 features per scale as shown in the following Table.

List of non-singular polynomial invariants up to third order expressed in gauge coordinates [ter Haar Romney 1994].

| Order | 1 | 2 | | | 3 | | | |
|---|---|---|---|---|---|---|---|---|
| Gauge | $I_w I_w$ | $I_{vv} I_w^2$ | $I_{vw} I_w^2$ | $I_{ww} I_w^2$ | $I_{vvv} I_w^3$ | $I_{vvw} I_w^3$ | $I_{vww} I_w^3$ | $I_{www} I_w^3$ |

The other tested feature set is the 3-jet consisting of all partial derivatives up to third order. This gives 10 features per scale. In calculating both polynomial invariants and 3-jet features, we define the partial derivative of the image, I, at scale, s, as $$I_{xs} = G_s * \frac{\partial I}{\partial x}$$

where Gs denotes the Gaussian with standard deviation s. This is implemented by analytical derivation of the Gaussian prior to convolution using the fact that G*∂I=I*∂G [Koenderink 1984]. The numerical implementation takes advantage of the Fast Fourier Transform and the convolution is carried out through the Fourier domain [ter Haar Romney 2003]. Both large feature sets are based on differential features related to image structure and the main difference is the rotational invariance provided by the invariant features. Only the best performing of the two sets are analysed in detail together with the stripiness features. We use scales 1, 2, and 4 mm based on previous findings with the stripiness features. In addition, a larger scale of 8 mm is introduced to allow for some larger scale information. This means we are testing 40 jet-features and 32 invariant features.

Figure 12:
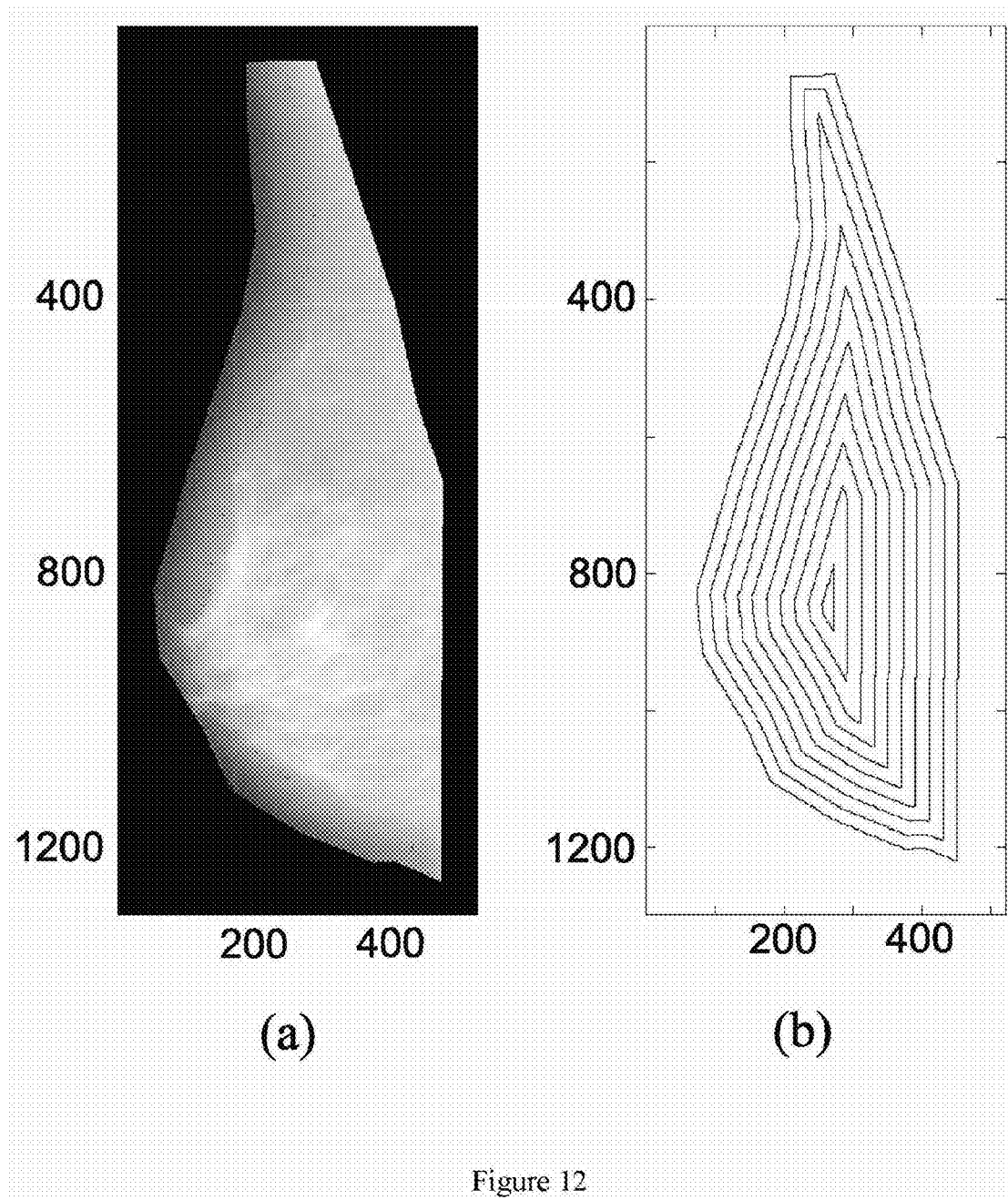
FIG. 12 shows a mammogram (panel (a)) and a contour plot of a corresponding distance map (panel (b))

So far, no information about where in the image a given feature vector was sampled has been available to the classifier. If the changes we are investigating mainly occur in specific regions this knowledge will help reduce noise from changes in unimportant regions. If there are important changes in one region simultaneously with important, but manifested inversely in the conventional features, in another region, this knowledge might improve classification dramatically. Therefore a crude breast coordinate frame is introduced for the feature selection experiments. Three position features are used: 1) Distance to nearest breast boundary implemented as a distance map, 2) Horizontal displacement from center of distance map, and 3) Vertical displacement from center of distance map. A mammogram and corresponding distance map are shown in FIG. 12. The position features represent a separate category of features and are included in all the work reported below.

The investigated mammograms are from the Dutch national breast cancer screening program. The data was originally used to investigate the effect of recall rate on earlier screen detection of breast cancers [Otten 2005]. Mammograms were collected from a total of 495 women participating in the biennial Dutch screening program. Of these, 250 were chosen as control subjects, and 245 were from women who were diagnosed with breast cancer. The data include screening mammograms from the time of diagnosis and screen-negative mammograms from at least two preceding screening examinations for both cases and controls.

The data set used in this study was formed by selecting the earliest available screen-negative mammograms for all participants. The result is a high risk (100%) group of cases who were diagnosed with breast cancer within 2-4 years, but radiological reading provided no evidence of cancer at this earliest examination and 2 years after, and a low-risk group who were not diagnosed with breast cancer for a minimum of 4 following years. The segmentation of breast tissue was done automatically using techniques presented by Highnam [1999] (breast boundary) and Karssemeijer [1998] (pectoral muscle). Subsequently the masks were post processed using a morphological opening with a circular structure element with a diameter of 10 mm and the largest component selected as final breast tissue mask to improve the segmentation quality. Only the right mediolateral oblique (mlo) views are analysed in these experiments.

In evaluating the performance of the classification of a certain feature set, the data is split up in a training and a test set, each consisting of 100 cancer and 100 control patients. Each component of each feature vector is normalized to unit variance across the entire training set. Standard sequential forward selection is used as feature selection algorithm with recognition rate quantified as area under ROC curve (AUC). The classification step is similar to what is described above, apart from the number of features used to represent each image. Machine memory only allowed 1000 feature vectors used per image due to the increase in feature space dimensionality and sample size. An equivalent k is used, modified to reflect the smaller total number of feature vectors in the training set (four times more in the HRT experiments implying that k=25 here).

Figure 13:
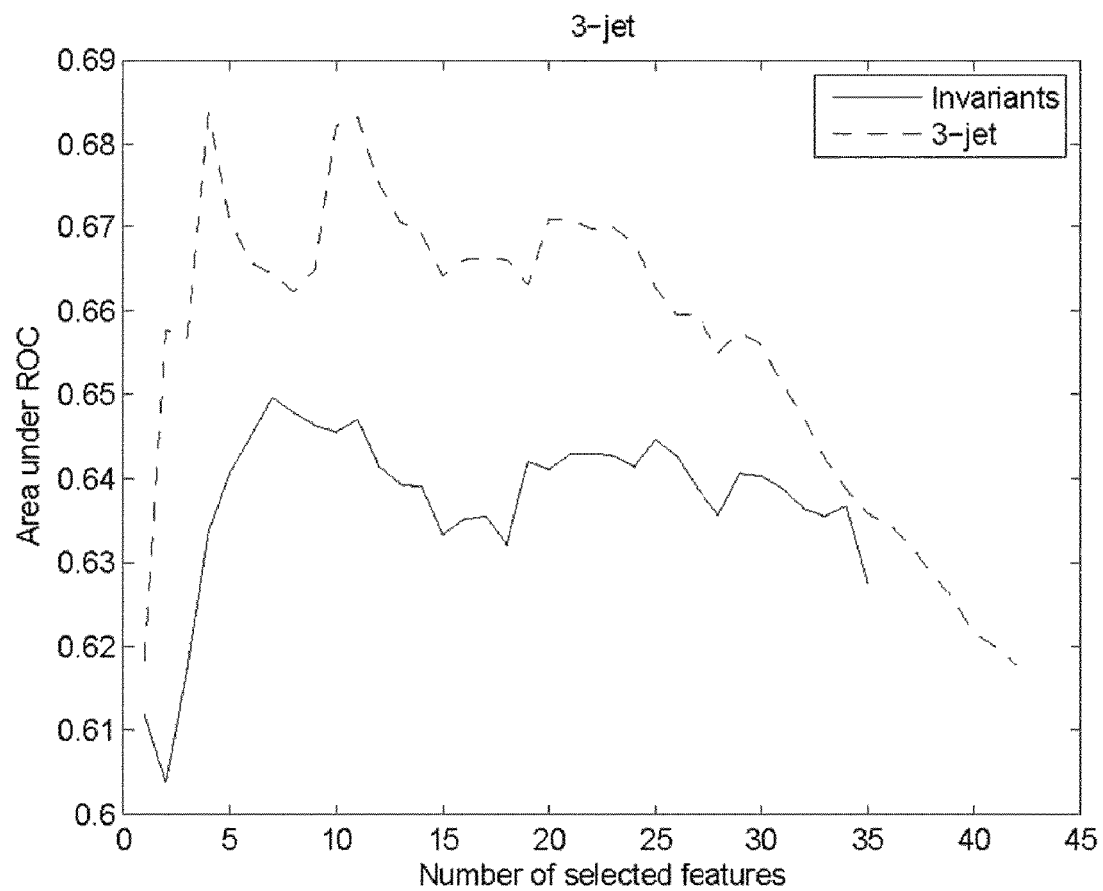
FIG. 13 shows an ROC plot as a function of number of selected features selected using SFS with no stopping criterion for Polynomial Invariants and for 3-jet.

The performance of Invariant features versus n-jet as two types of general features was investigated in two separate feature selection runs and the best performing type was selected. Using randomly selected train and test sets each consisting of 100 cases and 100 controls, FIG. 13 shows the performance of SFS with no stopping criterion applied once using the invariance and position features and once using 3-jet and position. The same patients were used for train and test sets were used in both cases.

Based on the results (AUC for 3-jet being everywhere larger than for invariants) the 3-jet features were selected and investigated in a large experiment in combination with the stripiness features. Based on FIG. 13, 10 features were selected as stopping criterion. One might argue that 15 or 20 would be a safer selection number (also including the second local maximum), however we would rather be able to make a clearer inference on the type of features related to risk than potentially getting a, probably, small boost in recognition rate. The first top of the 3-jet ROC in FIG. 13 (AUC=0.6837) is at four selected features 0.6837 and the second top (AUC=0.6832) at 11 selected features.

To gather information on which features are selected, 100 SFS runs are calculated for three different setups. Each run uses a new random train and test set. These sets are again each made of 100 cases and 100 controls. First we investigate only 3-jet and position features. Then stripiness features are included as selectable by the SFS algorithm. Finally, it is tested whether forcing SFS to select the three stripiness features improve results.

TABLE 1

The 3-jet features are ordered as follows. This information is needed to read the feature indices of FIGS. 14, 15 and 16.

| Nr. | ∂x | ∂y |
|---|---|---|
| 1 | 0 | 0 |
| 2 | 0 | 1 |
| 3 | 1 | 0 |
| 4 | 0 | 2 |
| 5 | 1 | 1 |
| 6 | 2 | 0 |
| 7 | 0 | 3 |
| 8 | 1 | 2 |

TABLE 1-continued

The 3-jet features are ordered as follows. This information is needed to read the feature indices of FIGS. 14, 15 and 16.

| Nr. | ∂x | ∂y |
|---|---|---|
| 9 | 2 | 1 |
| 10 | 3 | 0 |

Figure 14:
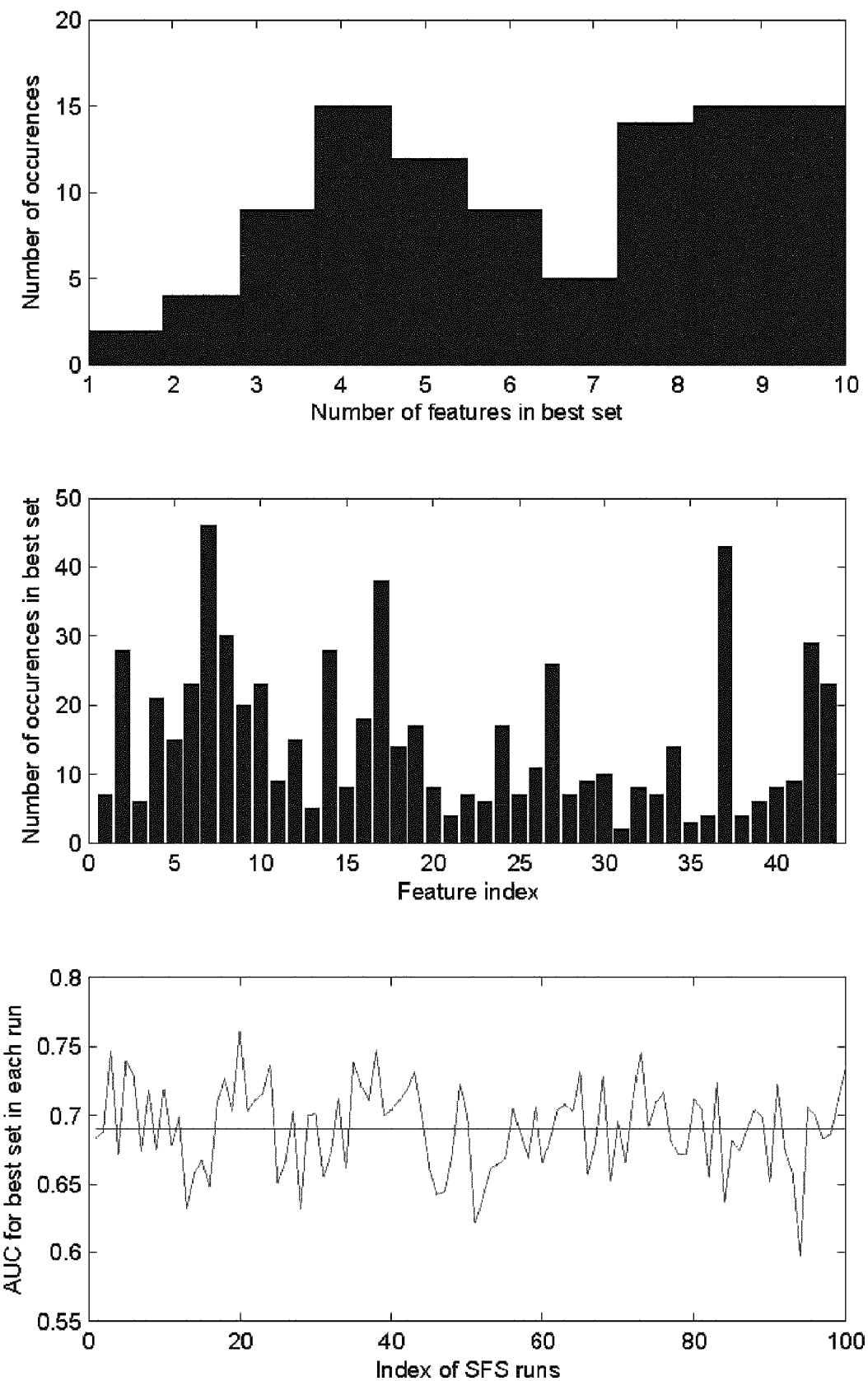
FIG. 14 shows feature selection statistics for only jet features. Average AUC=0.69±0.03.
Figure 15:
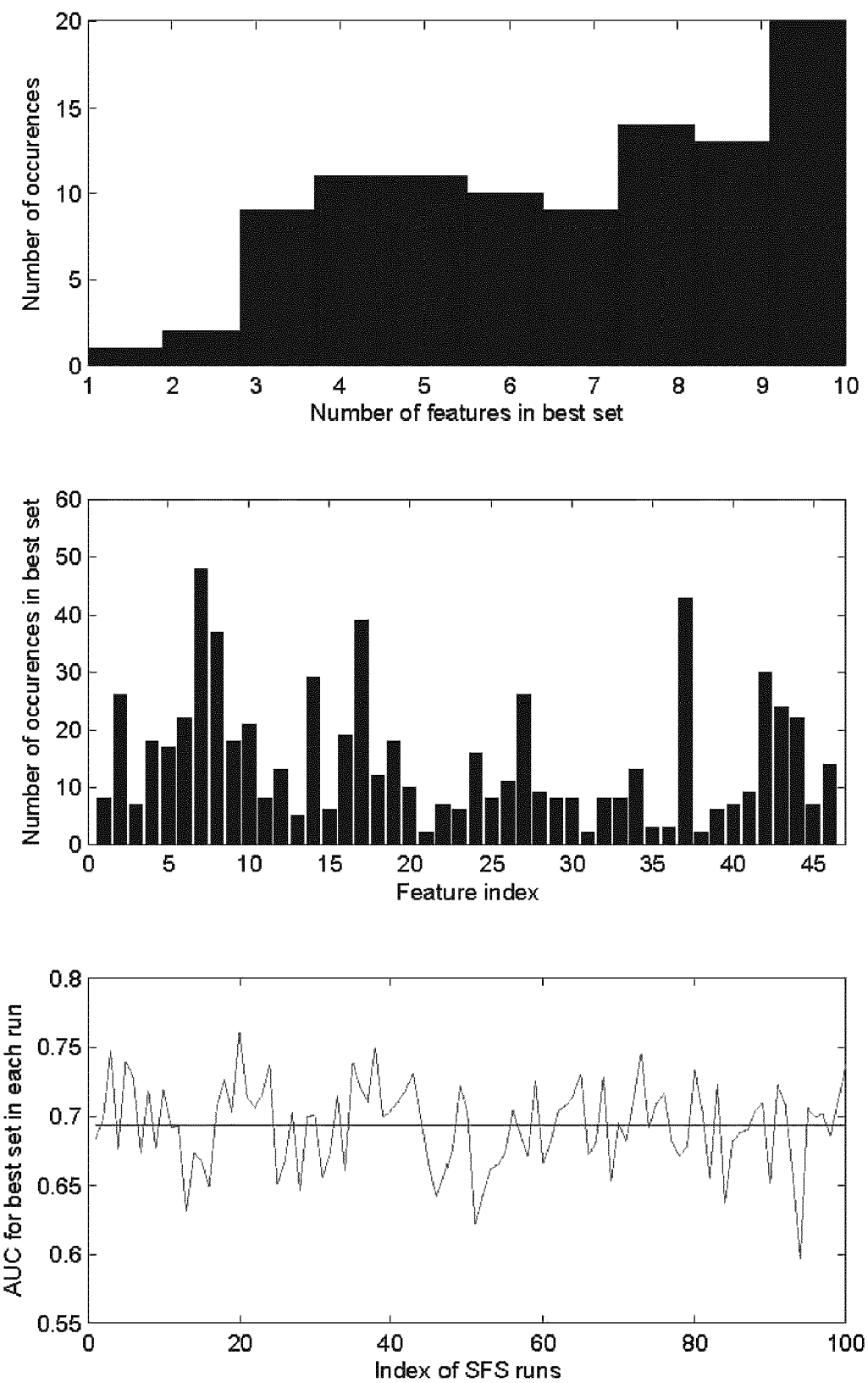
FIG. 15 shows feature selection statistics for jet features and stripiness features. Average AUC=0.69±0.03.
Figure 16:
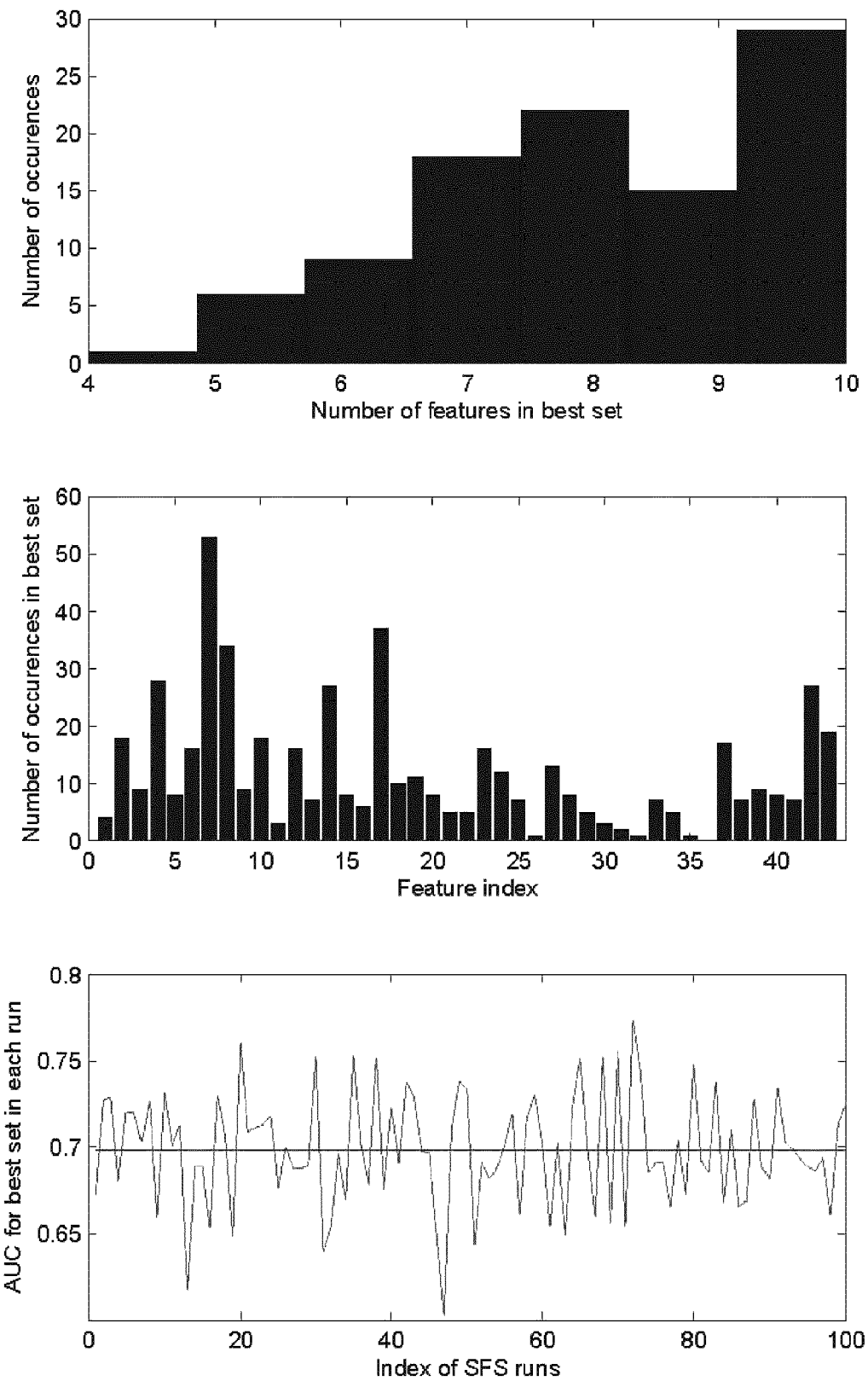
FIG. 16 shows feature selection statistics for jet features and stripiness features forced in the initial selection. Average AUC=0.70±0.03.

Images are represented by features from the same 1000 pixels in all experiments and the same 100 randomized train-test sets are used in the three setups making it possible to compare both overall performance and individual runs. FIGS. 14, 15 and 16 show the results of the 100 runs of n-jet, n-jet+stripy selectable, and n-jet+stripy forced. The features from 1-10 are the 3-jet at scale 1 mm, from 11-20 the 3-jet at scale 2 mm, from 21-30 at 4 mm and 31-40 at 8 mm. In order to read the feature numbers the ordering of the 3-jet features is displayed in Table 1. Origo of the image coordinate system is in the upper left corner which means that the x-direction is vertical and the y-direction horizontal. Features 41-43 are the distance to skin line, horizontal displacement, and vertical displacement respectively. Features 44-46 are the stripiness features at scales 1, 2, and 4 mm.

We have demonstrated the ability and potential of including learning of features to improve and specialize measures. The histograms of selected features in FIGS. 14, 15, and 16 give some information about the relationship between features and classes, which was one of the potential benefits of feature selection. Though a bit too flat to give a clear picture, it seems that the derivatives in the horizontal direction (2, 4, 7, 12, 14, ..., 37), and the horizontal and vertical position (42 and 43) are the features most indicative of risk. 0th order features and pure vertical derivatives are very seldom selected. This may be the reason why the 3-jet performed better than the polynomial invariants—the orientation of structure matters.

That the position features are important is supported by findings by Li et al., building on the work by Huo et al., showing a statistically significant decrease of performance as the location of the used region of interest (ROI) was varied from the central region immediately behind the nipple. Li et al. do not compare the results obtained using ROIs to using the whole breast area for feature estimation.

The stripiness features, shown earlier to be indicative of HRT, appears to be only weakly related to risk. This is in line with findings by Boyd et. al. [Boyd 2006] indicating that the effects of hormone therapy on mammographic density, and on breast cancer risk, are separate and not related causally.

Figure 17:
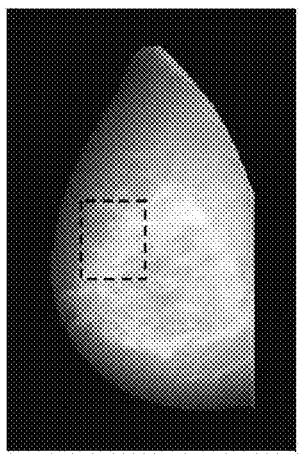
FIG. 17 shows two sample mammograms and corresponding likelihood images using features [7 17 27 37 42 43]. Case (a) has an average pixel probability of 48.9% and case (b) 52.6%.
Figure 17:
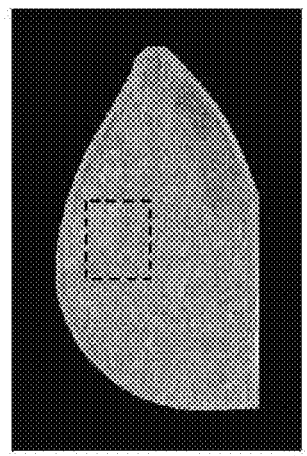
Figure 17:
Figure 17:
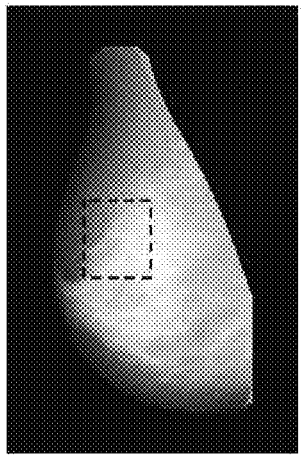
Figure 17:
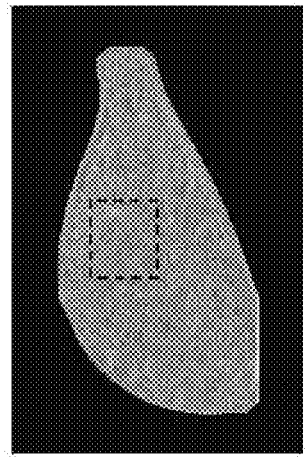
Figure 17:
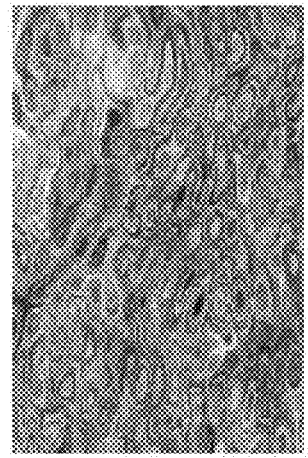

To see how a mammogram and corresponding likelihood image actually look we computed the likelihood images of two cases, using the feature set [7 17 27 37 42 43], and included them in FIG. 17. Case (a) is from a patient who had a screen-detected cancer in the right breast four years later. The BIRADS score of the mammogram is 3 but the likelihood score is quite low, 48.9% compared to an average of 50.2±0.9 for all the cases. Case (b) is an interval case also with a BIRADS score of 3 but a higher likelihood score, 52.6%. Although it is difficult to relate the appearance of the likelihood images to the corresponding mammograms, it is clear from the zoomed regions of interest that there is some structure present.

To compare with results by Huo et al. the histogram skewness was computed for all the images. This was the single feature found most related to risk in [Huo 2000]. One difference in implementation is that we compute the skewness of the entire breast region and Huo et al. use a smaller ROI. The skewness is one of the features found related to mammographic density by Boone et al. [1998] and is related to the degree of symmetry of the histogram.

Huo et al. report an AUC of 0.82±0.04 for discrimination of 15 BRCA1/BRCA2 mutation carriers versus 143 'low-risk' women. Classifying the images in the present study as cases or controls based on histogram skewness gave an AUC of 0.60. In comparison we on average get 0.70±0.03 with the selected cancer features.

The further aspect of the invention relating to a new coordinate system for images will now be described.

In the design of a breast coordinate system, we require the following properties from the transform: (1) it should be based on anatomical features available in the mammograms; (2) it should establish pointwise correspondence between different breasts; (3) the number of parameters should be as small as possible to achieve robustness; (4) the transform should depend continuously and smoothly on the variations of the shape of the breast; (5) the mapping, its inverse, and their Jacobians, should be numerically computable.

Figure 18:
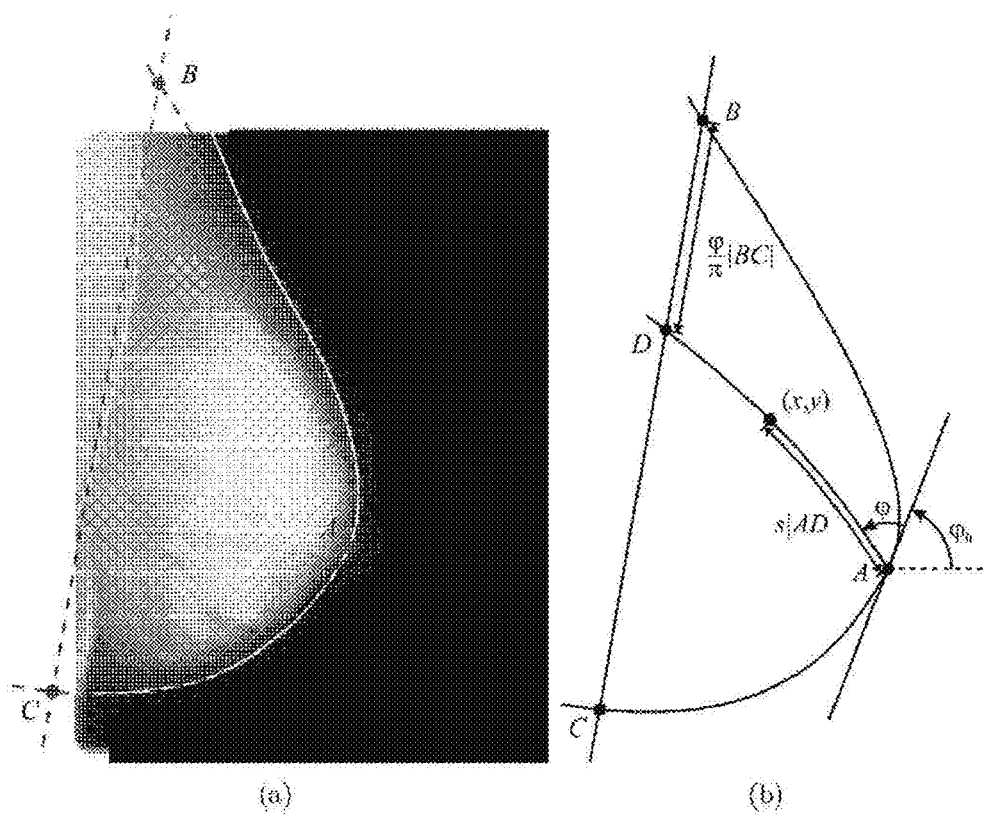
FIG. 18 shows in panel (a) a typical mammogram having marked thereon points defining a coordinate system in accordance with an aspect of the invention, and, in panel (b) the coordinate system itself.

We start with the fact that there are three anatomical features in the breast, the nipple, the breast boundary, and the pectoral muscle, that can be robustly found in each 2D mammogram. We therefore use these features as the geometric reference features (see FIG. 18): we identify the nipple as the 2D point A, approximate the border of the pectoral line and the breast tissue as the pectoral line BC, and the breast boundary as a curve containing the point A. Since only the nipple is identified as a single 2D point in a mammogram and it has a clear anatomical and geometric meaning, it is selected as the origin of our coordinate system. FIG. 18 illustrates the breast coordinate system. As seen in panel (a) the construction is based on the landmarks A, B, and C, and the breast boundary normal at A. The points B and C are the intersection of the pectoral line (the boundary approximation of the pectoral muscle) and the parabolic breast boundary approximations. As seen in panel (b), the breast coordinates $(s, \phi)$, $s \in S$, $\phi_\epsilon \Psi$, of the point $(x, y)$ in the Cartesian coordinate frame are defined as the relative distance from the nipple along the parabolic line, and the direction of the parabola at the nipple, respectively. The parabola is computed from the nipple point A, the direction angle $\phi$ at A, and the point D on the pectoral line, where $$|BD| = \frac{\varphi}{\pi}|BC|.$$

So far in our construction, we have a pointwise correspondence at the nipple while the pectoral line forms a line correspondence. To establish pointwise correspondence between the remaining points, we first note that we need two parameters to parametrise continuously 2D mammograms. Moreover, coordinate lines of such parametrisation should obviously be non-linear instead of lines, which do not have any direct anatomical meaning. As a line is uniquely represented by giving two distinct points on a line, to keep our coordinate system simple and robust we sought a suitable family of curves that we could solve from three points Instead of the family of lines we selected the family of second order curves as the candidates serving as coordinate lines of the breast coordinate transform. A general second order curve has five parameters (six distinct elements in the symmetric 3×3 coefficient matrix minus the homogeneous scaling) which can be solved uniquely from five points on the curve in a general position. We pick up the subset of general second order curves by considering the parabolae (discriminant vanishes) which have the additional constraint that their vertex points are at the nipple. Such parabolae have three degrees of freedom, i.e., three points in a general position are enough to uniquely identify such a parabola.

The remaining anatomical landmark, the breast boundary is approximated by the left and right branch of the two parabolae that both have the vertex at the nipple. In addition, to make the boundary approximation continuous up to the first order at the nipple, we require that the first principal axes of the two parabolae coincide. To identify these boundary parabolae, the normal direction at the nipple and additionally one point on each side of the boundary curve is needed. The intersection points of the parabolic boundary approximation and the pectoral line are defined as the points B and C in FIG. 18.

The nipple has, both anatomically as well as in our construction, a central role. Since there is a branch of milk ducts originating from the nipple, to take the breast anatomy into consideration, we require that a branch of parametric curves coinciding at the nipple A forms the coordinate lines of the coordinate system. Moreover, since we have selected the parabolic approximation for the breast boundary curves, it is natural to define the coordinate lines as the family of parabolae whose vertices are at the nipple.

The parabolae are parametrised by the angle $\phi \in [0, \pi]$ between the direction vector of the parabola at the vertex A and the tangent, parametrised by the angle $\phi_0$, of the breast boundary at A, see FIG. 18, panel (b). To make the parametrisation unique, we need one more constraint equation for the parabolae. We thus require that the uniform direction span at the nipple A corresponds to a uniform span of the intersection points on the pectoral line. In other words, we constrain the intersection point D on the line BC and the parabola to lie with the distance $\phi/\pi |BC|$ from B.

To complete the breast coordinate transform, we need another parameter that parametrises the points on the parabolae. In order to keep the relative scale of the breast intact, and acknowledging the role of the nipple as the centre of our coordinate system, we define the parameter s as the relative geodesic distance from the nipple to the pectoral line in the image. That is, s will vanish at A and give the unity value on the pectoral line, and $0 \leq s \leq 1$ between the nipple and the pectoral line.

To summarise, the breast parameters or the points A, B, C, and the tangent direction angle $\phi_0$ encode the shape of the breast. Given the breast parameters, there is a one-to-one mapping between the breast coordinate pair (s, $\phi$) and the image coordinates (x, y). The details of the numerical computation of this mapping and its inverse will be considered in the following section.

Let us first consider the computation of the forward transform $T: \mathbb{R}^2 \to \mathbb{R}^2$ such that $$\begin{pmatrix} s \\ \varphi \end{pmatrix} = T\begin{pmatrix} x \\ y \end{pmatrix}. \tag{1}$$

The computation is divided into two parts: first finding the parabola C, parametrised by $\phi$, which coincides with the given point $(x, y) = (x_0, y_0)$, and then solving the relative distance s.

To simplify the representation of the parabola, we transform it into the coordinate frame where the vertex is in the origin and the symmetry axis is the y-axis. The parabola transforms to this normalised frame by applying the transform $$x' = \begin{pmatrix} R & t \\ 0 & 1 \end{pmatrix} x \tag{2}$$

$$\equiv Dx$$

$$\triangleq R\begin{pmatrix} x - x_A \\ y - y_A \end{pmatrix}$$

$$\equiv \begin{pmatrix} \cos(\varphi + \varphi_0) & \sin(\varphi + \varphi_0) \\ -\sin(\varphi + \varphi_0) & \cos(\varphi + \varphi_0) \end{pmatrix} \begin{pmatrix} x - x_A \\ y - y_A \end{pmatrix},$$

to its points, represented in the homogeneous form on the left. The parabola in the transformed coordinate frame then has the form $$y' = \frac{y_0'}{x_0'^2} x' \Leftrightarrow x'^T \begin{pmatrix} \frac{y_0'}{x_0'^2} & 0 & 0 \\ 0 & 0 & -\frac{1}{2} \\ 0 & -\frac{1}{2} & 0 \end{pmatrix} x' \equiv x'^T C' x' = 0. \tag{3}$$

Hence, $$0 = x'^T C' x' = x^T D^T C' D x \equiv x^T C x \triangleq f_1(x, y, \phi). \tag{4}$$

To find $\phi$, corresponding to (x, y), we need to find the zero crossing of the function $f_1(x, y, \phi)$ with respect to $\phi$. The zero crossing is however not unique for given (x, y), so we perform the search as follows. Let $(x_D, y_D)$ be the point intersection between the line BC and the conic defined by $\phi$ and let l be the line that goes through the point (x, y) and is parallel to the tangent of the boundary parabolae at $(x_A, y_A)$. Let $(\tilde{x}, \tilde{y})$ be the intersection point of the parabola $\phi$ and the line l which is on the same branch of the parabola as $(x_D, y_D)$. The search for $\phi$ is performed by finding the zero-crossing of the signed distance between the points $(\tilde{x}, \tilde{y})$ and (x, y), in the function of $\phi$, that is a simple one-dimensional search.

As soon as $\phi$ is identified, we compute the relative geodesic distance s from the nipple A, normalised so that the point D on the pectoral line has the unity distance along the same geodesic. In practise, we write the normalised parametric form of the parabola in the function of the parameter $\zeta$ as $$\begin{pmatrix} \zeta \\ \zeta^2 \end{pmatrix} = \begin{pmatrix} 1 & 0 \\ 0 & \frac{x_0'^2}{y_0'} \end{pmatrix} R\begin{pmatrix} x - x_A \\ y - y_A \end{pmatrix} \tag{5}$$

$$\Leftrightarrow \begin{pmatrix} x \\ y \end{pmatrix}$$

$$= R^T \begin{pmatrix} 1 & 0 \\ 0 & \frac{y_0'}{x_0'^2} \end{pmatrix} \begin{pmatrix} \zeta \\ \zeta^2 \end{pmatrix} + \begin{pmatrix} x_A \\ y_A \end{pmatrix}.$$

Hence, (6)

$$s = \frac{s_{abs}(\zeta)}{s_{abs}(\zeta_D)},$$

where (7)

$$s_{abs}(\zeta) = \int_0^\zeta \sqrt{\left(\frac{\partial x(\zeta)}{\partial \zeta}\right)^2 + \left(\frac{\partial y(\zeta)}{\partial \zeta}\right)^2} \, d\zeta$$

-continued $$= \frac{1}{2a}\zeta\sqrt{a^2+\zeta^2} + a\log(\zeta+\sqrt{a^2+\zeta^2}) - a\log|a|,$$

and $a=y'_0/{x'_0}^2$.

Let us then consider the numerical implementation of the inverse transform $$\begin{pmatrix} x \\ y \end{pmatrix} = T^{-1}\begin{pmatrix} s \\ \varphi \end{pmatrix}. \tag{8}$$

First, the conic coefficient matrix C corresponding to $\phi$ is solved by using (2), (3) and (4) using the point D as $(x_0, y_0)$.

Then we search for the zero crossing of the implicit function $$h(\zeta) = \partial(\zeta) - s \tag{9}$$

by one dimensional search. There is a two-fold ambiguity for the zero-crossings, where the solutions $\zeta_1$ and $\zeta_2$ are related by $\zeta_1 = -\zeta_2$. The correct solution is selected by picking the one that is on the same branch of the parabola as the point D. The coordinates (x, y) are then finally obtained from (5).

The implicit form of the breast coordinate transform for corresponding coordinates (x, y) and (s,φ) can be written as $$f(x, y, s, \varphi) = 0 \tag{10}$$

$$\Leftrightarrow \begin{pmatrix} f_1(x, y, \varphi) \\ f_2(x, y, s, \varphi) \end{pmatrix} \equiv \begin{pmatrix} x^T C x \\ s(x, y, \varphi) - s, \end{pmatrix} = 0$$

where we have used the fact that $\zeta$ depends on (x,y,φ) according to (5).

Let us first consider the Jacobian of the forward transform. Locally, we are interested in the behaviour of the implicit function g: $\mathbb{R}^2 \to \mathbb{R}^2$, defining the transform T locally as the mapping (x, y)→(s, φ). Using the implicit function theorem, we find the Jacobian of the forward transform by setting z=(x, y) and implicitly differentiating $$f(z, g(z)) = 0, \tag{11}$$

on both sides that yields $$\frac{\partial f}{\partial z} = 0, \Leftrightarrow D_1 f + D_2 f \frac{\partial g}{\partial z} = 0, \tag{12}$$

where $$D_1 f = \begin{pmatrix} 2x^T & C_{2\times 3}^T \\ \frac{\partial s}{\partial x} & \frac{\partial s}{\partial y} \end{pmatrix}, \tag{13}$$

$$D_2 f = \begin{pmatrix} x^T \frac{\partial C}{\partial \varphi} x & 0 \\ \frac{\partial s}{\partial \varphi} & -1 \end{pmatrix},$$

where c=vec(C). Thus, the Jacobian of the forward transform $$J_T \equiv \frac{\partial g}{\partial z} = -(D_2 f)^{-1} D_1 f. \tag{14}$$

The Jacobian of the inverse transform is similarly $$J_{T^{-1}} = (J_T)^{-1} = -(D_1 f)^{-1} D_2 f. \tag{15}$$

When the breast coordinate system is used in image analysis, one may need to extract Gaussian derivative features from the images with respect to the coordinate frame. We thus investigate how to compute arbitrary mixed Gaussian derivatives from mammograms so that the derivative directions are attached to a common reference coordinate frame. In extracting the features, the local scale of the breasts is kept constant as we assume that the local discriminating factors have fixed physical size, even though breasts globally have large variability in size. To make aligned feature extraction between different mammograms of different people, we thus match the positions and orientations using the breast coordinates but do not alter the local scale.

In practise, the positions are matched by computing the features in fixed locations defined by (s″, φ″), n=1, 2, ..., N in the parameter space while the corresponding image locations (x(s″, φ″), y(s″, φ″)) are computed using the inverse transform $T^{-1}$. The orientations, corresponding to the unit vectors $u_s$, $u_\varphi$ pointing at the directions of s and φ axes in the parameter space at (s″, φ″), are obtained as the columns vectors $(j_1, j_2)$ of the Jacobian of the inverse transform, evaluated at (s″, φ″). To not affect the scale of the image of to be processed, we normalise the orientation vectors to the unit vectors $v_1 = j_1/\|j_1\|$ and $v_2 = j_2/\|j_2\|$.

The goal is to compute a mixed Gaussian derivative of an arbitrary order in the original image in the directions $v_1$ and $v_2$ using the fixed scale on the image plane. We first consider the case of a single derivative in the direction $v_1$, corresponding to the direction $u_1$ in the parameter space. Let $\theta_1$ be the polar angle of the vector $v_1$. The Gaussian derivative in the direction $v_1$ for the image f, is $$D_{\theta_1}(g*f) = (\cos\theta_1 \;\; \sin\theta_1)\begin{pmatrix} D_x \\ D_y \end{pmatrix}(g*f) \tag{16}$$

$$= v_{\theta_1}^T \begin{pmatrix} D_x(g*f) \\ D_y(g*f) \end{pmatrix}$$

$$= v_{\theta_1}^T \begin{pmatrix} g_x * f \\ g_y * f \end{pmatrix}$$

$$\equiv v_{\theta_1}^T (\nabla_g f).$$

In general, we are interested in an arbitrary mixed derivative $$\underbrace{D_{\theta_1} \ldots D_{\theta_1}}_{k_1 \text{ times}} \underbrace{D_{\theta_2} \ldots D_{\theta_2}}_{k_2 \text{ times}} (g*f) \equiv D_{\theta_1}^{k_1} D_{\theta_2}^{k_2}(g*f) \tag{17}$$

where the derivative is taken $k_1$ times corresponding to the direction $u_1$, and $k_2$ times in the direction $u_2$, where $\theta_1$ and $\theta_2$ are the polar angles of the direction vectors $v_1$ and $v_2$, respectively. Generalising the derivative computation above, we may write $$D_{\theta_1}^{k_1} D_{\theta_2}^{k_2}(g*f) = D_{\theta_1}^{k_1-1} D_{\theta_2}^{k_2}\left(v_{\theta_1}^T(\nabla_g f)\right) \tag{18}$$

$$= D_{\theta_1}^{k_1-2} D_{\theta_2}^{k_2}\left(v_{\theta_1}^T\left(\nabla\left(v_{\theta_1}^T(\nabla_g f)\right)\right)\right)$$

$$= D_{\theta_1}^{k_1-2} D_{\theta_2}^{k_2}\left(v_{\theta_1}^T(\nabla \nabla_g^T f) v_{\theta_1}\right)$$

-continued $$= D_{\theta_1}^{k_1-2} D_{\theta_2}^{k_2} (v_{\theta_1}^T H_g v_{\theta_1}),$$

where $H_g$ is the second order Gaussian derivative tensor (Hessian). The quadratic form $v_{\theta_1}^T H_g v_{\theta_1} \equiv D_g^{ij} v_{\theta_1}^i v_{\theta_1}^j$ where $D_g^{ij}$ denote the 2nd order Gaussian derivative of the image with respect to the variable i and j while using the tensor notation and the Einstein summation convention. The tensor notation thus allows us to write $$D_{\theta_1}^{k_1} D_{\theta_2}^{k_2}(g*f) = D_g^{i_1 \ldots i_k j_1 \ldots j_{k_2}} v_{\theta_1}^{i_1} \ldots v_{\theta}^{i_{k_1}} v_{\theta_2}^{j_1} \ldots v_{\theta_2}^{j_{k_2}},$$  (19)

where $D_g^{i_1 \ldots i_k j_1 \ldots j_{k_2}}$ is the Gaussian derivative tensor of the order $k_1+k_2$, containing all the mixed Gaussian derivatives of that order. In other words, the mixed Gaussian derivatives of an arbitrary order in the directions $v_1$ and $v_2$ can be computed as a contraction of the Gaussian derivative tensor and the unit vectors pointing at the directions.

The following is an example of the use of this aspect of the invention.

Figure 19:
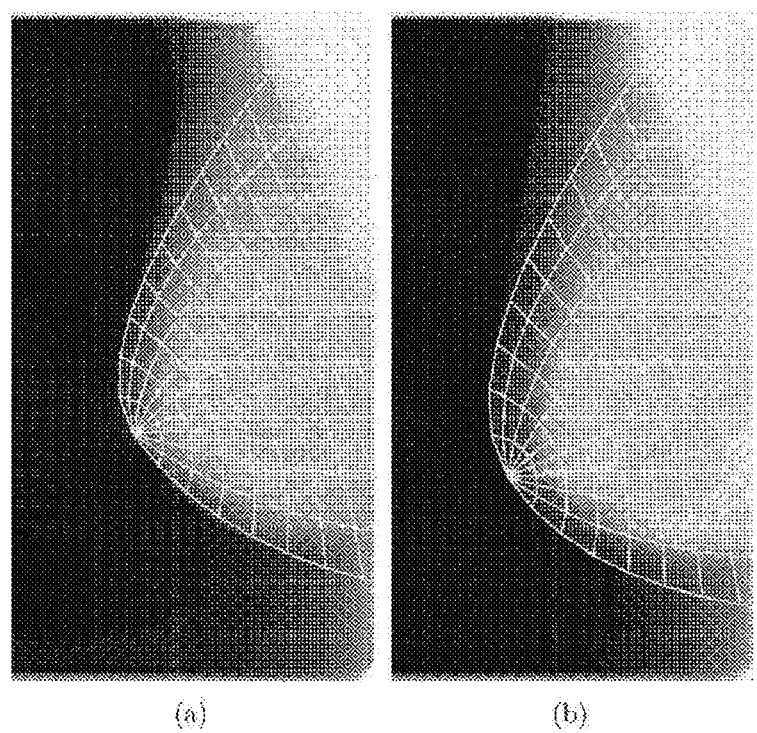
FIG. 19 shows in panels (a) and (b) the coordinate system applied to two different images of the same breast.

The parameters of the breast coordinate transform, i.e., the three landmark points A, B, and C, and the direction φ were found as follows. First the boundary parabolae were computed by four manually picked points: the nipple A, a point on the upper and lower part of the breast boundary, respectively, and one more point in the breast in the normal direction from the nipple. The pectoral line was computed from three manually picked points on the pectoral line by the least squares fitting. The meet of the boundary parabolae and the pectoral line were then computed; from the two pairs of solutions those two were selected as the estimates of B and C that lay on the respective sides of the boundary normal at the nipple. The breast coordinates are illustrated in FIG. 19. In FIG. 19, we see how the breast coordinate mapping can be used, for instance, in registering (a) baseline and (b) follow-up mammograms. The curves plotted on the images illustrate the breast coordinate lines s=0, 0.1, 0.2, . . . , 1 and φ=0, π/9, 2π/9, . . . , π.

To evaluate quantitatively the breast coordinate transform, we estimated the correlation coefficient of intensity values between the baseline and follow-up mammograms of 37 patients from a longitudinal study [Karemore 2009] assuming that no significant change of intensity occurs within interval of 2 years in the placebo group. We computed the correlation coefficient by no registration, intensity-based registration [Karemore poster 2009] and the breast-coordinate-system-based registration of the invention using one thousand randomly picked positions inside the breast region visible in the mammogram. The results are in Table 2, where the mean correlation coefficient over the test population is used as the result and the standard deviation as the bounds. The results suggest that the anatomical landmarks provide a more prominent and stable intensity correlation score compared to the direct intensity-based registration.

TABLE 2

Mean intensity correlation coefficient over the longitudinal study.

| Method | Correlation coefficient |
|---|---|
| Unregistered | 0.8 ± 0.2 |
| Intensity registration | 0.9 ± 0.1 |
| Breast coordinate registration | 0.92 ± 0.05 |

Figure 20:
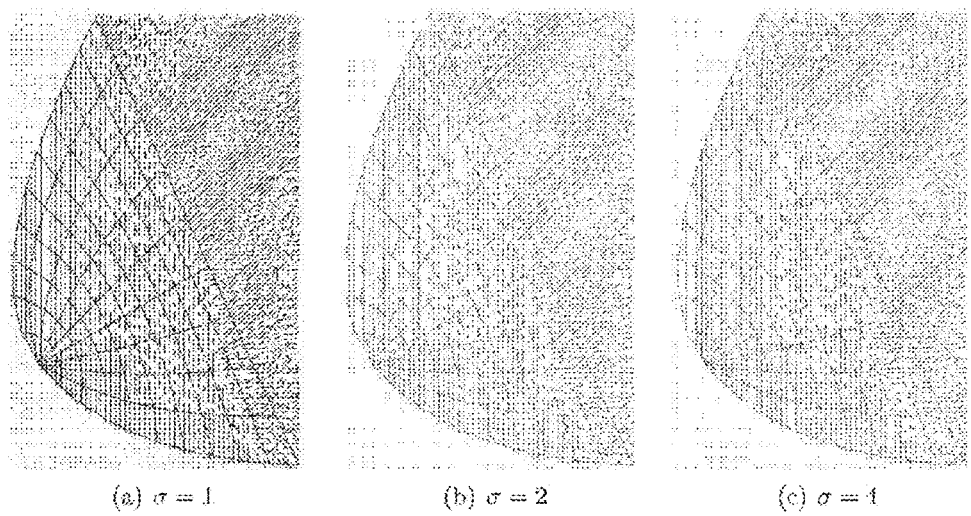
FIG. 20 shows in panels (a) to (c), gradient orientation histograms on three different scales.

Using the breast coordinate transform, we then computed gradient orientation histograms, weighted by the gradient magnitude, from a database 495 mammograms from Nijmegen case-control study [van Engeland 2003]. The gradient orientation, neglecting the sign of the gradient, was computed in the uniform 58×98 grid in a reference mammogram with the increment of ten pixels. The locations of the grid points and sixteen local orientations in the other mammograms were identified by the breast coordinate transform and its inverse transform, and the gradient direction was computed by using the Gaussian derivative filters on three different scales. The gradient weighted orientation histograms are illustrated in FIG. 20, where the most frequent gradient direction at each location is displayed. FIG. 20 shows gradient orientation histograms, on three different scales, plotted in the reference mammogram to which the orientations in the other mammograms are aligned by the breast coordinate transform. The black lines illustrate the most frequent gradient orientation (sign neglected) at each position with respect to the coordinate system of the reference mammogram. The gradient orientation histograms reflect the fact that the breast tissue, outside the glandular tissue, is in most cases horizontal with respect to the reference mammogram. In addition, the pectoral muscle has its distinctive tissue orientation and the glandular tissue region has distinctive statistical behaviour.

Figure 21:
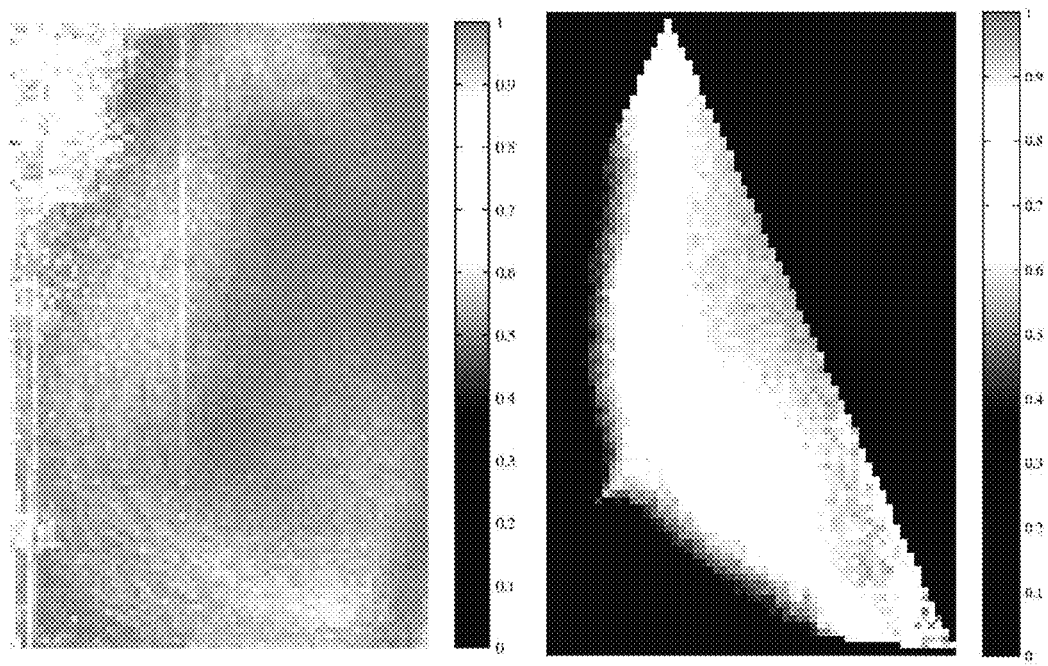
FIG. 21 shows in panels (a) and (b) entropy levels within gradient weighted orientation histograms for an unregistered mammogram and for the mammogram registered using the coordinate system described herein.

We additionally analysed the weighted gradient orientation histograms by estimating the entropy $$H(x, y) = -\sum_{i=1}^{16} P_i(x, y) \log P_i(x, y),$$  (20)

where we use the biased estimates $$\hat{P}_i(x, y) = \frac{h_i(x, y) + \epsilon}{16\epsilon + \sum_i h_i(x, y)}$$

for the orientation probabilities, and $0 < \epsilon \ll 1$. By this choice, $\lim_{n \to \infty} \hat{P}_i(x, y) = P_i(x, y)$. In addition, for the ideal orientation histogram $h_i(x, y) = n\delta(i-i')$, peaked at $i=i'$, $\lim_{n \to \infty} \hat{H}(x, y) = 0$. The entropy of the orientation histograms is displayed in FIG. 21. FIG. 21 shows entropy of the gradient weighted orientation histogram at the scale σ=1. The histogram is scaled so that uniformly distributed orientation, i.e. completely random orientation, has the unity value. An ideal histogram, peaked at only one direction, has the entropy zero. By using the breast coordinate frame, the gradient orientation is the most predictable at the breast boundary approximation close to the nipple, whereas the orientation is most random close to the pectoral line.

It can be seen that the registration of the breasts using the breast coordinate system substantially reduces the entropy of the orientation histograms indicating that the histograms are less random opposed to the unregistered mammograms. Moreover, the entropy image follows the anatomical structure of the breast. This result is summarised in Table 3 by the mean entropy scores, where the sample standard deviation is used as the bounds.

TABLE 3

Mean entropy of the weighted orientation histograms

| Method | Score |
|---|---|
| Unregistered | 0.95 ± 0.05 |
| Registered | 0.7 ± 0.2 |

Then we further evaluated the breast coordinate transform by analysing the separation of the cancer (n=245) and control (n=250) groups in the cross-sectional study of 495 images taken from Dutch screening program, see Table 4. We extracted the Gaussian derivative filters at four different scales up to order of three (i.e., the 40-Jet features), and additionally used position features, in one thousand random positions inside the breast region visible in the mammograms using proposed breast coordinate system. We used the scales 1, 2, 4, and 8 mm, where the resolution of images were 5 pixels/mm. The data was split up in a training and a test set, each consisting of 100 cancer and 100 control patients and the components of feature vectors were normalised to unit variance over the training set. Then, an ANN [Arya 1998] classifier was trained to separate pixels of the two classes. Due to memory limitations, related to the increase in feature space dimensionality and sample size, only 1000 feature vectors were used per image. We used the equivalent k=100 to reflect the smaller total number of feature vectors in the training set.

TABLE 4

Characteristics of the cross-sectional study

|  | Cancer (n = 245) | Control (n = 250) |
| --- | --- | --- |
| Age (years) | 66.7 (0.5) | 66.3 (0.5) |
| BMI (kg/m) | 25.0 (0.3) | 24.9 (0.3) |
| Percentage Density † | 0.20 (0.02) | 0.19 (0.02) |
| BIRADS score † | 2.3 (0.1) | 2.1 (0.1) |

Scores refer to the mean and SEM;
† denotes the significance level P < 0.05.

The feature selection picked up the feature subset consisting of the second order derivatives, i.e. $L_{ss}$ and $L_{\phi\phi}$, at three different scales, i.e., 1, 2 and 3 mm. This selection indicates that the distinguishing orientation between the cancer and control breast tissue are towards the s and $\phi$ axis directions which more prominently follow the tissue orientation.

Figure 22:
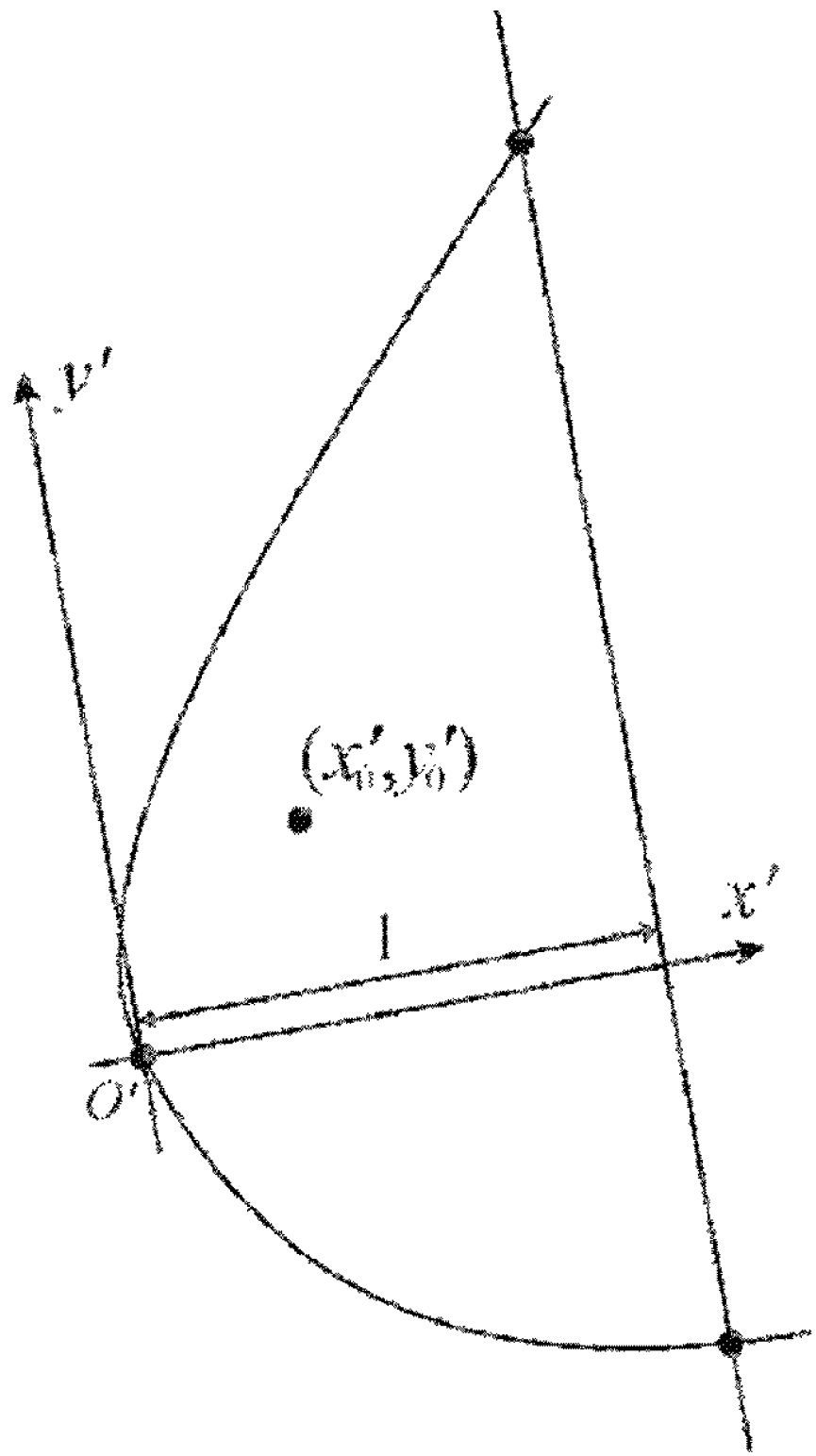
FIG. 22 shows an alternative simplified coordinate system used as a basis for comparison in an Example below.

We evaluated the classification performance or accuracy by computing the area-under-the-receiver-operator-curve (AUC). We compared the breast coordinate registration to the unregistered Cartesian coordinate system of the mammograms, and a simplified coordinate system, which was created as follows. In the simplified system, the nipple is set as the origin and the mammogram is rotated so that the pectoral line becomes a horizontal line (see FIG. 22). FIG. 22 shows a simplified breast coordinate system for comparison with that of the invention that registers the mammograms into a nipple centered coordinate system, where pectoral muscle forms the vertical line with the unity distance from the nipple. The mapping from the Cartesian system to this coordinate system is the 2D similarity transform x'=sRx+t of which Jacobian is simply sR, where s, R, t denote scaling, 2D rotation matrix and translation vector, respectively.

The position correspondence is determined by defining that the distance of the pectoral line is unity from the pectoral muscle, but the local scales are kept intact in the feature extraction similarly as in the proposed full anatomical breast coordinate system.

The AUC score was higher for the breast anatomy based coordinate system of the invention than the system using the image coordinates of mammograms or the simplified coordinate system. The results are summarised in Table 5.

TABLE 5

Classification scores for the cross-sectional study

| Method | AUC |
| --- | --- |
| Unregistered Cartesian | 0.64 |
| Simplified Coordinate System | 0.64 |
| Full Anatomical Coordinate System | 0.66 |

The anatomical breast coordinate transform described above facilitates computerised analysis of mammograms. The transform defines one-to-one correspondence between 2D point in a mediolateral (ML) or mediolateral oblique (MLO) view mammograms and the parameter space, and thereby also serves as a mammogram registration method. Since the mammograms are 2D projections of deformable 3D shapes, the correspondence is however approximate as far as individual localisable 3D features are concerned. However, the breast coordinate transform allows statistical comparison between arbitrary breasts taken from the similar view that facilitates, for instance, breast cancer risk assessment.

The breast coordinate transform is constructed by setting a subset of second order curves, parabolae as the coordinate lines of the transform. The construction allows numerical the computation of the forward and inverse transforms as well as Jacobians of the transforms at given position of the image or the parameter space. The construction thereby provides orientation correspondence in addition to pointwise correspondence which means that features can be extracted in anatomically registered directions. In our experiments, Gaussian derivative features were extracted in this manner.

It would be mathematically desirable if the coordinate transform was conformal, i.e., angle preserving mapping. In terms of feature extraction, it would mean that the registration transform for the feature extraction filter would locally be a similarity transform instead of a general affinity. In practise, we relax the conformality requirement since the projection of the breast into a mammogram is not conformal. Our breast coordinate transform, is thus not strictly conformal but it resembles conformal mapping along the central part of the breast towards the pectoral line where the coordinate lines are close to orthogonal. The strongest deviations from the conformality occur close to the breast boundary.

Our experimental evaluation suggests that the breast coordinate transform facilitates better results in mammogram analysis compared to cases where no registration or intensity based registration is used. For instance, in longitudinal studies the intensity correlation was shown to be more prominent. In addition, the gradient orientation histograms were shown to be less random than in the unregistered case. The feature classification results show that the separation of the cancer and control groups is better in terms of the P-value of the paired T-test and the AUC score.

The orientation histograms showed that they comply with the anatomical breast tissue orientation; the entropy distribution of the orientation histograms are also anatomically sensible. In addition, the feature selection picked up the second order derivatives in the s and $\phi$ directions as the most prominent. In other words, the derivative information in the function of the distance from the nipple and the angle of distance provide the most discriminative information; this makes sense due to the anatomical registration of the breast. Also, employing such coordinate transformation for classifying orientation features in mammogram gives better discrimination than radiologist assisted scoring such as BIRADS and the percentage density.

The described breast coordinate system provides a way of defining corresponding local orientations across mammograms. For instance, if one has a direction vector v at point $(s,\phi)$ in one mammogram and the corresponding point is $(s',\phi')$ in another mammogram the breast coordinate system also provides the means of computing the direction v' in the second mammogram that correspond to the direction v in the first mammogram. In practice, one may be interested in extracting oriented features so that the orientations have been registered by the coordinate system.

Compared to the system of Georgesson, the system offers substantial advantages. In Georgesson, the skin line is the basis for the equidistant curves constituting one coordinate, but the skin line is non-parametric so that these coordinate equidistant curves will need to be computed numerically. To define the skin line, one needs to capture all the points along it, whereas in the system of the invention, only three points approximately on the skin line are needed. The coordinate system described above is based on parametric curves, greatly simplifying the computations of e.g. Jacobians in image processing. So the third design criterion described above is not satisfied. Generally, the Georgesson system would be difficult to implement in practice.

REFERENCES

S. Arya, D. M. Mount, N. S. Netanyahu, R. Silverman, and A. Wu. An optimal algorithm for approximate nearest neighbor searching. Journal of the ACM, 45(6):891-923, 1998.

U. Bick, M. Giger, R. Schmidt, R. Nishikawa, D. Wolverton, and K. Doi. Automated segmentation of digitized mammograms. Academic Radiology, 2(1):1-9, 1995.

J. M. Boone, K. K. Lindfors, C. S. Beatty, and J. A. Seibert, "A breast density index for digital mammograms based on radiologists' ranking," *Journal of Digital Imaging*, vol. 11, no. 3, pp. 101-115, August 1998.

N. F. Boyd, J. M. Rommens, K. Vogt, V. Lee, J. L. Hopper, M. J. Yaffe, and A. D. Paterson, "Mammographic breast density as an intermediate phenotype for breast cancer," *The Lancet Oncology*, vol. 5, pp. 798-808, 2005.

N. Boyd, L. Martin, Q. Li, L. Sun, A. Chiarelli, G. Hislop, M. Yaffe, and S. Minkin, "Mammographic density as a surrogate marker for the effects of hormone therapy on risk of breast cancer," *Cancer Epidemiology Biomarkers & Prevention*, vol. 15, no. 5, p. 961, 2006.

J. W. Byng, N. F. Boyd, E. Fishell, R. A. Jong, and M. J. Yaffe, "The quantitative analysis of mammographic densities," *Physics in Medicine and Biology*, vol. 39, p. 162938, 1994.

J. W. Byng, N. F. Boyd, E. Fishell, R. A. Jong, and M. J. Yaffe, "Automated analysis of mammographic densities," *Physics in Medicine and Biology*, vol. 41, pp. 909-923, 1996.

J. W. Byng, N. F. Boyd, L. Little, G. Lockwood, E. Fishell, R. A. Jong, and M. J. Yaffe, "Symmetry of projection in the quantitative analysis of mammographic images," *European Journal of Cancer Prevention*, vol. 5, pp. 319-327, 1996.

R. Chandrasekhar and Y. Attikiouzel. A simple method for automatically locating the nipple on mammograms. IEEE transactions on medical imaging, 16(5):483-494, 1997.

E. Claus, N. Risch, and W. Thompson, "Autosomal dominant inheritance of early-onset breast cancer. implications for risk prediction." *Cancer*, vol. 73, no. 3, pp. 643-51, 1994.

M. H. Gail, L. A. Brinton, D. P. Byar, D. K. Corle, S. B. Green, C. Schairer, and J. J. Mulvihill, "Projecting individualized probabilities of developing breast cancer for white females who are being examined annually," *Journal of the National Cancer Institute*, vol. 81, no. 24, pp. 1879-86, December 1989.

F. Georgsson. Anatomical coordinate system for bilateral registration of mammograms. In Proc. Scandinavian Conference on Image Analysis (SCIA), volume 2749 of LNCS, pages 335-342, 2003.

Y. Guo, R. Sivaramakrishna, C.-C. Lu, J. Suri, and S. Laxminarayan. Breast image registration techniques: A survey. Med Biol Eng Comput, 44:15-26, 2006.

I. Guyon and A. Elisseeff, "An introduction to variable and feature selection," *The Journal of Machine Learning Research*, vol. 3, pp. 1157-1182, 2003.

B. M. ter Haar Romeny, L. M. J. Florack, A. H. Salden, and M. A. Viergever, "Higher order differential structure of images,"*Image and Vision Computing*, vol. 12, no. 6, pp. 317-325, July/August 1994.

B. ter Haar Romeny, *Front-End Vision and Multi-Scale Image Analysis*. Kluwer Academic Publisher, 2003.

R. Highnam and M. Brady, *Mammographic Image Analysis*, M. A. Viergever, Ed. Kluwer Academic Publishers, 1999.

Z. Huo, M. Giger, D. Wolverton, W. Zhong, S. Cumming, and O. Olopade, "Computerized analysis of mammographic parenchymal patterns for breast cancer risk assessment: Feature selection," Medical Physics, vol. 27, p. 4, 2000.

A. K. Jain, R. P. W. Duin, and J. Mao, "Statistical patternrecognition: Areview," IEEETr. on PAMI, vol. 22, no. 1, pp. 4-37, 2000.

G. Karemore, I. Arganda-Carreras, and M. Nielsen. Automatic and consistent registration framework for temporal pairs of mammograms in application to breast cancer risk assessment due to hormone replacement therapy (hrt). Int J CARS, 4(Supplement 1):S356, June 2009. Poster Session: 11th International Workshop on Computer-Aided Diagnosis.

G. Karemore and M. Nielsen. Fractal dimension and lacunarity analysis of mammographic patterns in assessing breast cancer risk related to hrt treated population: a longitudinal and cross-sectional study. In Medical Imaging 2009: Computer-Aided Diagnosis, volume 7260 of Proceedings of the SPIE, pages 72602F-72602F-9, 2009.

M. Kaman and K. Thangavel. Automatic detection of the breast border and nipple position on digital mammograms using genetic algorithm for asymmetry approach to detection of microcalcifications. Comput. Methods Prog. Biomed., 87(1):12-20, 2007.

N. Karssemeijer, "Automated classification of parenchymal patterns in mammograms," *Physics in Medicine and Biology*, vol. 43, pp. 365-378, 1998.

S. Kinoshita, P. Azevedo-Marques, R. Pereira, J. Rodrigues, and R. Rangayyan. Radon-Domain Detection of the Nipple and the Pectoral Muscle in Mammograms. Journal of Digital Imaging, 21(1):37-49, 2008.

Y. Kita, E. Tohno, R. Highnam, and M. Brady. A CAD system for the 3d location of lesions in mammograms. Medical Image Analysis, 6:267-273, 2002.

J. J. Koenderink, "The structure of images," *Biological cybernetics*, vol. 50, no. 5, pp. 363-370, 1984.

J. Koenderink and A. van Doorn, "Representation of local geometry in the visual system," *Biological Cybernetics*, vol. 55, no. 6, pp. 367-375, 1987.

S. Kwok, R. Chandrasekhar, Y. Attikiouzel, and M. Rickard. Automatic pectoral muscle segmentation on mediolateral oblique view mammograms. IEEE transactions on medical imaging, 23(9):1129-1140, 2004.

A. Méndez, P. Tahoces, M. Lado, M. Souto, J. Correa, and J. Vidal. Automatic detection of breast border and nipple in digital mammograms. Computer methods and programs in biomedicine, 49(3):253-262, 1996.

T. Ojala, J. Nappi, and O. Nevalainen. Accurate segmentation of the breast region from digitized mammograms. Computerized Medical Imaging and Graphics, 25(1):47-59, 2001.

J. D. M. Otten, N. Karssemeijer, J. H. C. L. Hendriks, J. H. Groenewoud, J. Fracheboud, A. L. M. Verbeek, H. J. de Koning, and R. Holland, "Effect of recall rate on earlier screen detection of breast cancers based on the dutch performance indicators," *Journal of the National Cancer Institute*, vol. 97, no. 10, pp. 748-754, May 2005.

S. Petroudi and M. Brady, "Breast density segmentation using texture," in *International Workshop on Digital Mammography*, S. M. Astley, M. Brady, C. Rose, and R. Zwiggelaar, Eds. Springer, 2006, pp. 609-615.

J. Raundahl, M. Loog, and M. Nielsen. Understanding hessian-based density scoring. In Proc. 8th International Workshop on Digital Mammography, volume 4046 of Lecture Notes in Computer Science, pages 447-452, Manchester, UK, June 2006.

J. Raundahl, M. Loog, P. Pettersen, L. Tanko, and M. Nielsen. Automated effect-specific mammographic pattern measures. IEEE Transactions on Medical Imaging, 27(8): 1054-1060, August 2008.

C. Tromans and M. Brady, "An alternative approach to measuring volumetric mammographic breast density," in *International Workshop on Digital Mammography*, S. M. Astley, M. Brady, C. Rose, and R. Zwiggelaar, Eds. Springer, 2006, pp. 26-33.

A. Whitney, "A direct method of nonparametric measurement selection," in *IEEE Trans. Comput.*, vol. 20, 1971, pp. 1100-1103.

S. van Engeland, P. Snoeren, J. Hendriks, and N. Karssemeijer. A comparison of methods for mammogram registration. IEEE Transactions of Medical Imaging, 22(11), 2003.

C. H. van Gils, J. H. C. L. Hendriks, R. Holland, N. Karssemeijer, J. D. M. Otten, H. Straatman, and A. L. M. Verbeek. Changes in mammographic breast density and concomitant changes in breast cancer risk. European Journal of Cancer Prevention, 8:509-515, 1999.

J. N. Wolfe. Risk for breast cancer development determined by mammographic parenchymal pattern. Cancer, 37(5): 2486-2498, 1976.

Yaffe et al, Physics in Medicine and Biology 39 (1994) 162938

M. Yam, M. Brady, R. Highnam, C. Behrenbruch, R. English, and Y. Kita. Three-dimensional reconstruction of microcalcification clusters from two mammographic views. IEEE Transactions on Medical Imaging, 20(6):479-489, 2001.

S.-C. Yang, H.-H. Hsu, G.-C. Hsu, P.-C. Chung, S. Guo, C.-S. Lo, C.-W. Yang, S.-K. Lee, and C.-I. Chang. 3d localization of clustered microcalcifications using cardio-caudal and medio-lateral oblique views. Computerized Medical Imaging and Graphics, 29:521-532, 2005.

F. Yin, M. Giger, K. Doi, C. Vyborny, and R. Schmidt. Computerized detection of masses in digital mammograms: Automated alignment of breast images and its effect on bilateral-subtraction technique. Medical Physics, 21:445, 1994.

C. Zhou, H. Chan, C. Paramagul, M. Roubidoux, B. Sahiner, L. Hadjiiski, and N. Petrick. Computerized nipple identification for multiple image analysis in computer-aided diagnosis. Medical Physics, 31:2871, 2004.

It will be appreciated that modifications to or variations of the embodiments described and illustrated may be made within the scope of the appended claims. In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings, including all patents, published patent applications, journal articles, and other publications cited herein and acknowledged above are hereby incorporated by reference. No acknowledgement of any prior published document herein should be taken to be an admission or representation that the teaching thereof was common general knowledge at the date hereof.

The invention claimed is:

1. A method for ascribing coordinates to positions of points within an image performed in a suitably programmed computer and comprising for each point for which a set of coordinates is desired computing a first coordinate value s and a second coordinate value $\phi$ defining the position of said point in a coordinate system $(s,\phi)$ wherein said coordinate system comprises a set of curves diverging from an apex point lying on a reference line which extends in a reference direction, wherein:
   a. each curve in said set of curves extending to intersect a base line extending from a first point to a second point, said first coordinate s representing a measure of a geodesic distance from said apex point along one said curve which contains said point, and said second coordinate $\phi$ representing an angle made between said curve and said reference line at said apex point; and
   b. said set of curves has 3 degrees of freedom.

2. A method as claimed in claim 1, wherein within a bounded domain $s \in S$, $\phi \in \Phi$ said curves are non-crossing.

3. A method as claimed in claim 1, wherein said first coordinate s is equal to or proportional to a ratio a:b where
   a=the geodesic distance of the point from the apex
   b=the geodesic distance from the apex to the intersection of said one curve with the base line.

4. A method as claimed in claim 1, wherein said curves in said set of curves are parabolas.

5. A method as claimed in claim 1, wherein said image is of a human breast including a nipple and a pectoral muscle, and said apex point is set at said nipple and said base line approximately follows the pectoral muscle or its boundary.

6. A method as claimed in claim 5, wherein said images are mammogram images.

7. A method of comparing information contained within a first image of an object with information contained within at least one related other image,
   wherein said first and other images are related by being images from approximately the same perspective of the same object or being images of a second instance of the same type of object,
   comprising ascribing coordinates to positions within each image by a method as claimed in claim 1 and comparing at least one characteristic of points in the respective images which have matching s and $\phi$ coordinates.

8. A method as claimed in claim 7, wherein each image is a mammogram image.

9. A method as claimed in claim 7, comprising calculating Gaussian derivatives of a pre-selected order of image intensities at said points.

10. A method as claimed in claim 7, further comprising classifying a said first image as belonging to a first class or a second class by applying a statistical classifier to said point image intensities.

11. A method as claimed in claim 10, wherein said images are mammograms and said classification is between belonging to a group of images of healthy breasts and belonging to a group of images of breasts characterised by cancer.

12. A method as claimed in claim 11, wherein said trained classifier is trained by unsupervised learning.

13. A method as claimed in claim 12, wherein said classifier is trained by supervised learning based on a set of images associated with a higher breast density and a set of images associated with a lower breast density.

14. A method as claimed in claim 11, wherein said trained classifier is trained by supervised learning.

15. A method as claimed claim 11, wherein said pixels are scored as belonging to one of said classes.

16. A method as claimed in claim 11, wherein said pixels are scored according to their probability of belonging to at least one of said classes.

17. A method as claimed in claim 16, wherein said quotient values are determined as the normalised difference between eigenvalues of a Hessian matrix based on Gaussian derivatives in s and $\phi$ coordinate directions at a predetermined scale of pixels of the image, which Gaussian derivatives relate the intensity of each pixel to the intensities of the neighbours of said pixel in s and $\phi$ coordinate directions.

18. A method as claimed in claim 17, wherein the predetermined model is defined in 25-dimensional space in which the three dimensions respectively represent the quotient value when calculated at a respective one of three different scales.

19. A method as claimed in claim 18, comprising a preliminary step of preparing said pre-determined model of the cluster map incorporating said at least two pre-plotted points.

20. A method as claimed in claim 18, wherein the step of preparing the model of the cluster map comprises:
   a) computing a quotient value for pixels in a test image of a breast based on the results of Hessian matrices compiled for said pixels in the image;
   b) plotting each quotient value in 3-dimensional space;
   c) randomly selecting at least two points amongst the quotient values as starting points;
   d) calculating the distance between each quotient value and each starting point and assigning each quotient value to the starting point to which it is nearest;
   e) calculating a mean of each group of points and redefining the starting point as the calculated mean point;
   iteratively repeating steps d) and e) until the calculated mean point is equal to the starting point, whereby the final calculated mean points are arranged to be the pre-plotted points of the model of the cluster map.

21. A method as claimed in claim 18, wherein the number of pre-plotted points determines the number of resulting clusters.

22. A method as claimed in claim 21, wherein four points are randomly selected as starting points to result in said four pre-plotted points for the model of the cluster map.

23. A method as claimed in claim 22, further comprising deriving Gaussian derivates at three different scales of the image to result in three different quotient values for each of said pixels, wherein the three quotient values correspond to the three dimensions of the pre-determined model.

24. A method as claimed in claim 18, wherein the pre-determined model of the cluster map has four pre-plotted points.

25. A method as claimed in claim 17, wherein the step of clustering further comprises:
   calculating which of said at least two pre-plotted points each plotted value is closest to; and
   assigning each value accordingly to said closest pre-plotted point to result in said two discrete clusters of plotted points.

26. A method as claimed in claim 11, wherein said quotient value is determined for each said pixel at each of a plurality of scales in coordinate directions defined by the s and $\phi$ coordinates of said pixel.

27. A method as claimed in claim 26, wherein the Hessian matrices are derived from Gaussian derivatives of the pixels in the image.

28. A method as claimed in claim 11, comprising
   plotting said quotient values on a pre-determined model of a cluster map, said cluster map having at least two pre-plotted points;
   clustering the plotted values around said at least two pre-plotted points to result in two discrete clusters; and
   deriving said parameter that changes alongside changes in breast density by computing the difference in area between said two clusters.

29. A method as claimed in claim 11, wherein said quotient values define characteristics representative of the shape of objects present in the image and a quotient value of relatively large magnitude represents a substantially elongate object located in the image.

30. A method of processing a mammogram image which includes a nipple and a chest wall to derive a value for a parameter useful in detecting differences in breast tissue in subsequent images of the same breast or relative to a control group of such images, said derived parameter being a parameter that changes alongside changes in breast density, the method comprising the steps of processing an image of at least part of a breast by:
   calculating in a suitably programmed computer for pixels of the image respective coordinates by a method comprising for each point for which a set of coordinates is desired computing a first coordinate value s and a second coordinate value $\phi$ defining the position of said point in a coordinate system (s, $\phi$) wherein said coordinate system comprises a set of curves diverging from an apex point set at said nipple and lying on a reference line which extends in a reference direction, each curve in said set of curves extending to intersect a base line set generally to follow said chest wall and extending from a first point to a second point,
   said first coordinate s representing a measure of a geodesic distance from said apex point along one said curve which contains said point, and said second coordinate $\phi$ representing an angle made between said curve and said reference line at said apex point
   computing for pixels of the image a quotient value representative of the aspect ratio of tissue structures depicted in the image;
   using a trained classifier to classify said pixels according to their respective said quotient values and assigning a score to the respective pixels representing their classification with respect to at least two classes;
   deriving said parameter that changes alongside changes in breast density based on the aggregate pixel membership scores of said classes.

* * * * *